US006826002B2

(12) United States Patent
Yanagimoto

(10) Patent No.: US 6,826,002 B2
(45) Date of Patent: Nov. 30, 2004

(54) MEASURING APPARATUS AND MEASURING METHOD FOR MEASURING PERFORMANCE CHARACTERISTICS OF RECORDING UNIT INCLUDING CIRCULAR RECORDING MEDIUM

(75) Inventor: Yoshiyuki Yanagimoto, Hyogo (JP)

(73) Assignee: Agilent Technologies, Inc., Palo Alto, CA (US)

( * ) Notice: Subject to any disclaimer, the term of this patent is extended or adjusted under 35 U.S.C. 154(b) by 398 days.

(21) Appl. No.: 10/012,617

(22) Filed: Oct. 30, 2001

(65) Prior Publication Data

US 2002/0135913 A1 Sep. 26, 2002

(30) Foreign Application Priority Data

Dec. 15, 2000 (JP) ........................................ 2000-381488

(51) Int. Cl.[7] ................................................. G11B 5/02
(52) U.S. Cl. ............................ 360/25; 360/31; 360/46; 360/51; 360/78.12; 360/78.09
(58) Field of Search ....................... 369/53, 1; 324/212, 324/226, 210; 360/31, 25, 46, 61, 51, 67, 68, 55, 77.02, 78.04, 78.12, 77.08, 78.05

(56) References Cited

U.S. PATENT DOCUMENTS 6,195,215 B1  2/2001  Yanagimoto et al.

6,493,177 B1 * 12/2002  Ell et al. .................. 360/78.05

OTHER PUBLICATIONS

IEEE Transactions On Magnetics, Mar. 2001, vol. 37, No. 2, 9 pages.

Digests of APMRC200 on Mechanical and Manufacturing Aspects of HDD, Asia–Pacific Magnetic Recording Conference MP11–01–02, pps. MP11–01–MP11–02, Nov. 2000.

* cited by examiner

Primary Examiner—Alan T. Faber

(57) ABSTRACT

A measuring apparatus and a method is provided for measuring performance characteristics of a recording unit including a circular recording medium on which one track is divided into a plurality of sectors, where the recording unit records a data signal on the recording medium by using a magnetic head. A mechanism device including micro actuator and a piezo-electric stage moves the magnetic head in a direction substantially perpendicular to a circumferential direction of the recording medium in response to a control signal. The measuring apparatus writes a write signal for respective sectors while moving the magnetic head by outputting the control signal having different levels corresponding to respective sectors to the mechanism device, and reads out the written write signal, then measuring a read-out write signal as a read signal relative to a position of the magnetic head.

20 Claims, 25 Drawing Sheets

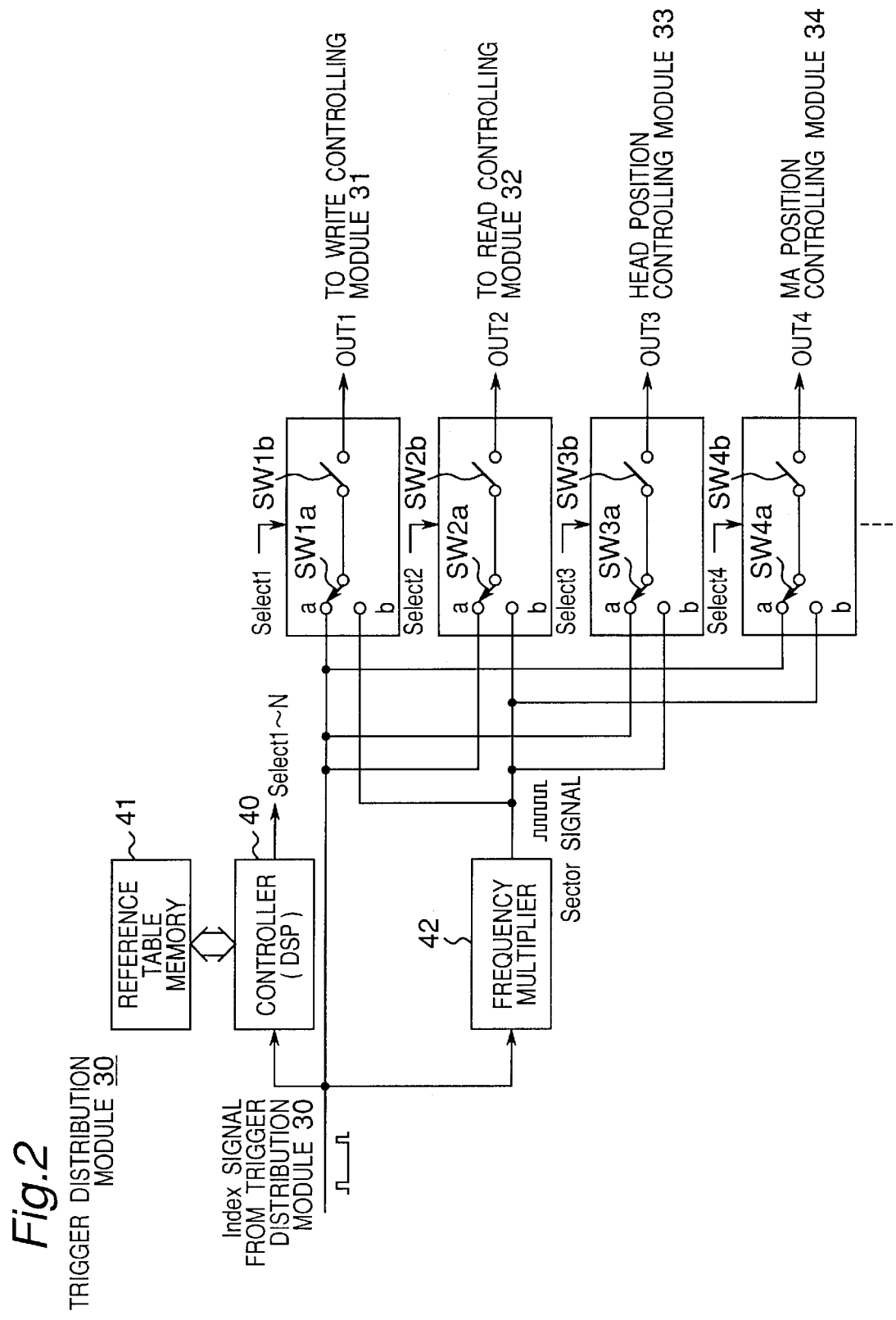

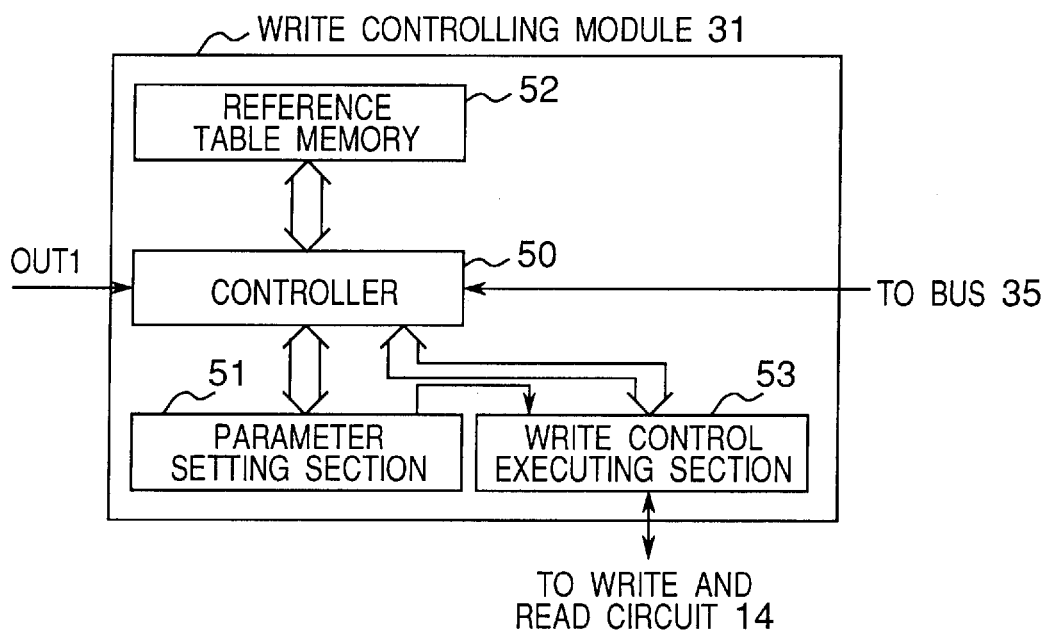
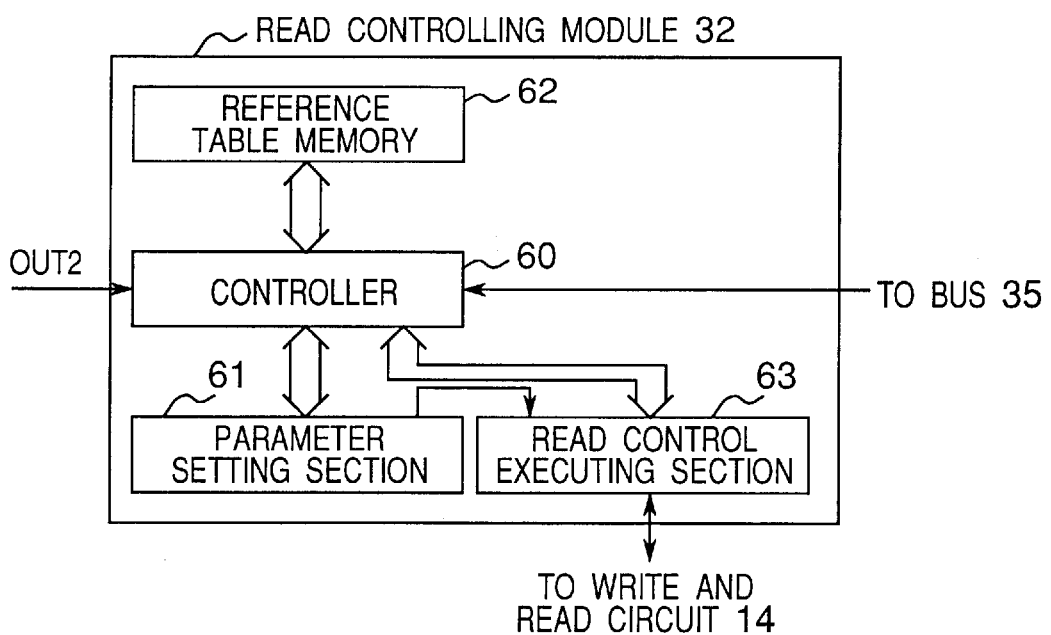

PREFERRED EMBODIMENT

ENLARGED DIAGRAM OF PART 201 OF Fig.20

Fig.23A PRIOR ART

FIRST ROUND

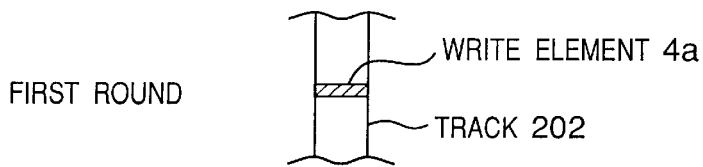

WRITE ELEMENT 4a
TRACK 202

Fig.23B PRIOR ART
SECOND ROUND: MOVEMENT BY PIEZO STAGE 9a

Fig.23C PRIOR ART

THIRD ROUND
READ ELEMENT 4b
TRACK 202
→ MEASURE OUTPUT AMPLITUDE TAA(1)

Fig.23D PRIOR ART
FOURTH ROUND: MOVEMENT BY PIEZO STAGE 9a

Fig.23E PRIOR ART

FIFTH ROUND
READ ELEMENT 4b
TRACK 202
→ MEASURE OUTPUT AMPLITUDE TAA(2)

Fig.23F PRIOR ART
SIXTH ROUND: MOVEMENT BY PIEZO STAGE 9a

Fig.23G PRIOR ART

SEVENTH ROUND
READ ELEMENT 4b
TRACK 202
→ MEASURE OUTPUT AMPLITUDE TAA(3)

⋮

Fig.23H PRIOR ART
(2N+1)-th ROUND

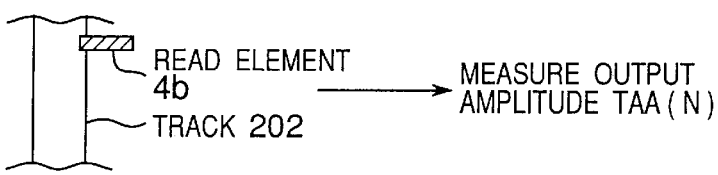

READ ELEMENT 4b
TRACK 202
→ MEASURE OUTPUT AMPLITUDE TAA(N)

SECOND ROUND : RETURN OF WRITE ELEMENT 4a TO INITIAL POSITION BY APPLICATION OF CONTROL VOLTAGE Vc=0V TO MA6

THIRD ROUND : MOVEMENT BY STAGE 9a
(CORRESPONDING TO Fig.23B)

FOURTH ROUND AND AFTER : SIMILAR OPERATION TO THAT IN Fig.23C AND AFTER

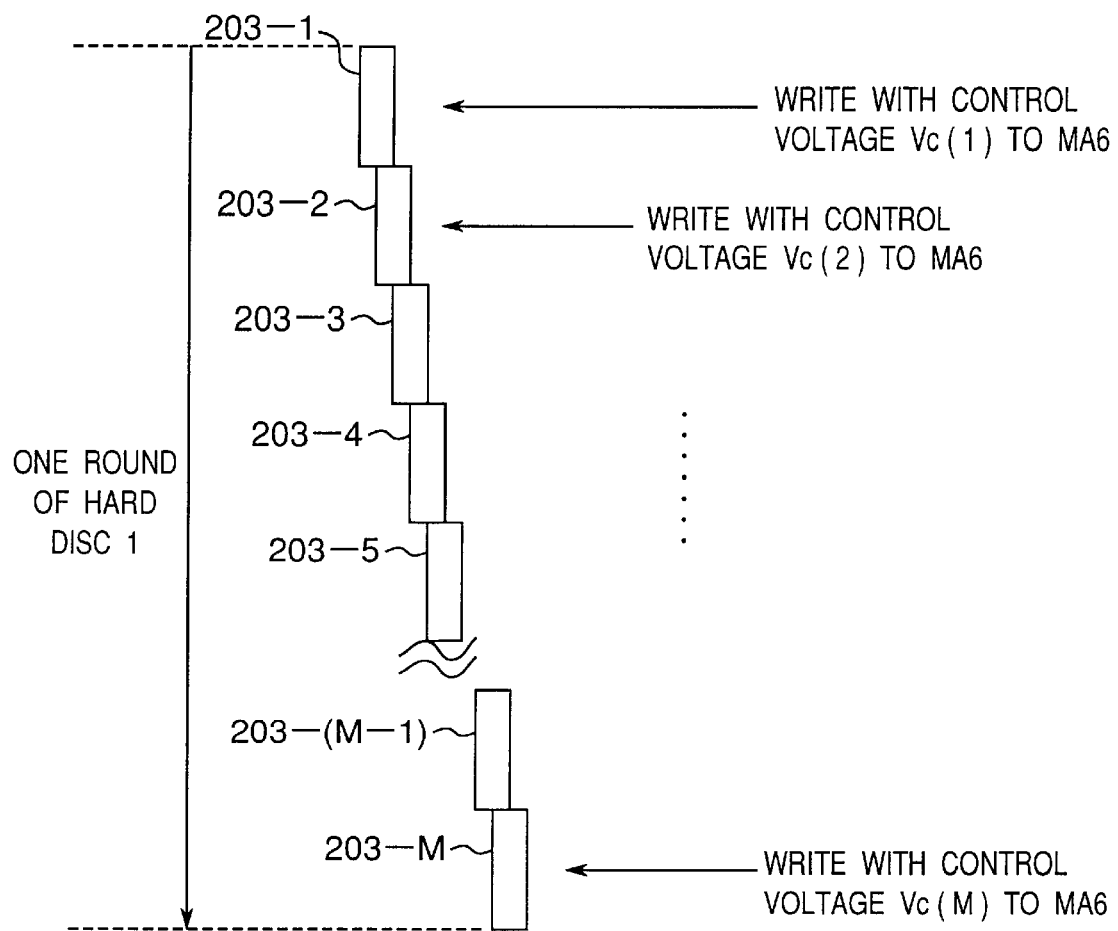

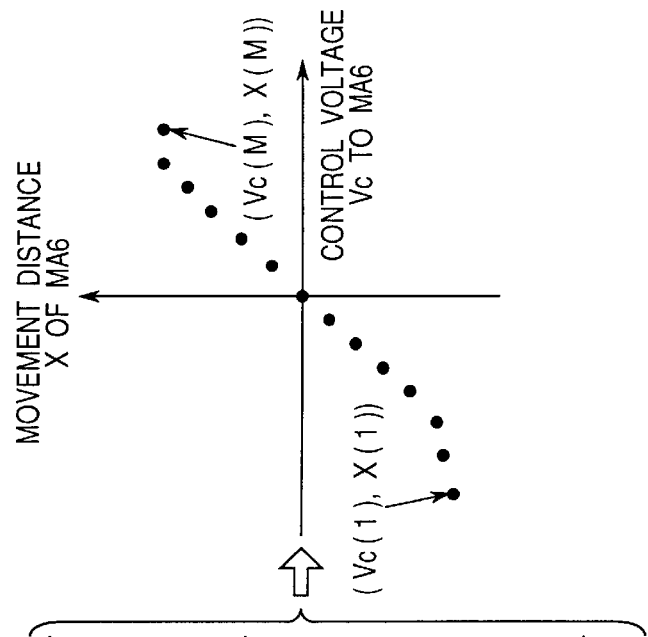
Fig.29C
GRAPH OF MOVEMENT DISTANCE CHARACTERISTIC
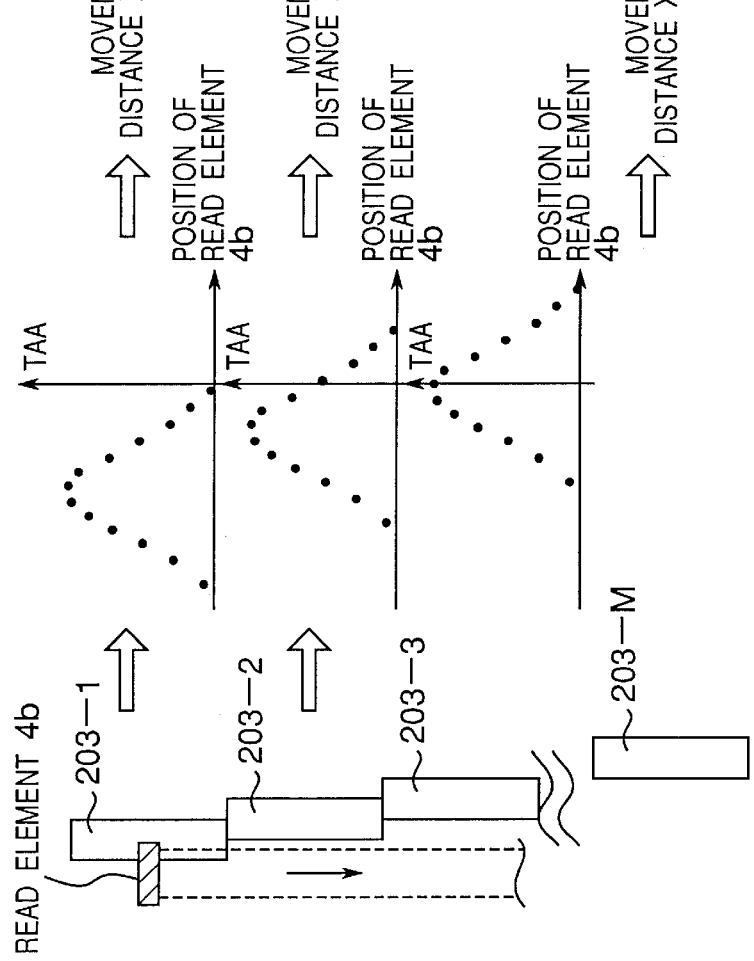
Fig.29A
PREFERRED EMBODIMENT
MEASURE EACH TAA WHILE MOVING MAGNETIC HEAD 4 BY CONTROLLING MA6 EVERY ROUND
Fig.29B
GRAPH OF TAA FOR EACH ROUND

MEASURING APPARATUS AND MEASURING METHOD FOR MEASURING PERFORMANCE CHARACTERISTICS OF RECORDING UNIT INCLUDING CIRCULAR RECORDING MEDIUM

BACKGROUND OF THE INVENTION

1. Field of the Invention

The present invention relates to a measuring apparatus and a measuring method for use in a recording unit including a circular recording medium, in particular, to a measuring apparatus and a measuring method for measuring performance characteristics of a recording unit including a circular recording medium such as a hard disk, a floppy disk or an optical disk such as CD, DVD, a magneto-optical disk (of ROM, write once type, rewriting type), or the like, and components such as a head for recording a data signal on the above recording medium, and the like.

2. Description of the Prior Art

Upon testing either a fixed type magnetism fixture magnetic disk drive unit (referred to as a hard disk unit hereinafter) for driving a hard disk, the above hard disk, or a magnetic head, there is the practice of evaluating the performance characteristics of the above hard disk, the disk drive unit and the circuit therefor, and the testing process includes the following steps:

(a) inserting a spindle into a center hole of the hard disk and supporting the magnetic head so as to electromagnetically couple the magnetic head with the surface of the hard disk in a non-contact manner;

(b) executing either a data writing process or a data reading process on the hard disk by means of the magnetic head while rotating the spindle by means of a spindle motor; and (c) evaluating the performance characteristics of the hard disk unit including the hard disk.

As performance evaluation items the following ones can be enumerated. The performance evaluation items include the following:

(a) track average signal amplitude (Track Averaged Amplitude: referred to as a TAA hereinafter);
(b) asymmetry of a signal amplitude;
(c) pulse width (PW);
(d) asymmetry of a pulse width;
(e) base line;
(i) non-linear type bit shift amount (Non-linear Transition bit Shift: NLTS);
(g) overwrite characteristic (OverWrite: OW);
(h) bit error rate (Bit Error Rate: BER);
(i) margin, and so on.

When evaluating the performance of a hard disk, it is required to set parameters for measurement, and the parameters include the following:

(a) position of a magnetic head (referred to as a head position hereinafter);
(b) head angle (skew);
(c) spindle rotation speed;
(d) signal frequency;
(e) write data pattern;
(f) write current amount;
(g) write compensation amount (concretely, an amount of compensation for compensating for the write change timing);
(h) MR (Magnetic Resistance) head bias current, and so on.

In this case, the signal frequency, the write data pattern, the write current amount, the write compensation amount, the head position and the MR head bias current are write parameters for the hard disk, while the head position, the head angle and the MR head bias current are read parameters for the hard disk.

A procedure in measuring the above evaluation items has a sequence of parameter setting, writing onto a disk, reading out and evaluating the characteristics of the read signal. Conventionally, it has been a common practice to obtain a parameter dependency of the measured values of the evaluation items by changing set values of the above-mentioned parameters in small steps and repetitively executing a similar measurement. According to the conventional technique, such a measurement has been executed by writing data with one fixed parameter for one rotation of the disk when the spindle is rotated by one turn, and reading out the written data during another turn, thereby obtaining the measurement data for one point. By repeating this sequence a plurality of times while changing the parameter, a graph is obtained according to the measuring method based on the conventional technique (referred to as a first prior art hereinafter). That is, according to the conventional technique, one parameter has been set per one round of the track.

There is sometimes such a case that the state of a read element is disadvantageously changed by a magnetic field in the writing stage, then consequently this leads to an unstable characteristic (referred to as instability hereinafter). This phenomenon may be a kind that occurs only once per several times or another kind that occurs as a variation measurement. Therefore, in measuring such a characteristic it is a common practice to repeat the write and read operations many times, and then statistically evaluate the measured values of read signals. When measuring the above-mentioned instability by a conventional technique (referred to as a second prior art hereinafter), static data including the average value and variance of the measured value data are obtained by executing a plurality of times, a process including the steps of, first of all, writing desired data on the whole track of the disk, writing data which will be abandoned for a part of the track, and thereafter reading out the data on the rest of the track.

The above-mentioned prior art measuring method and measuring apparatus have had such a problem that the measuring time is relatively long.

Furthermore, when executing the measurement by switching the measurement item upon evaluating the performance characteristics of a hard disk, it takes much measuring time according to the prior art methods in an attempt at viewing the influences on the parameters requiring a significantly long time for convergence. As the parameters requiring a significantly long time for convergence, there can be enumerated the frequency, the head position and so on. For example, a relationship between the head position and the read signal amplitude is shown, where the relationship is called the track profile. Such a measurement (referred to as a third prior art hereinafter) takes a long time for moving the head position as compared with that of the rotation of the spindle, and this leads to such a problem that the measuring time is elongated.

In order to solve the above-described problems, the Japanese patent laid-open publication No. 11-053701 discloses, for example, a measuring apparatus for use in a recording unit for measuring performance characteristics of the recording unit including a record medium on which one track is divided into a plurality of sectors, where the measuring apparatus can measure performance characteristics at a speed higher than that of the prior art, by writing a write signal with a write parameter value changed for respective sectors, by reading out the written write signal, with predetermined read parameters for respective sectors, and by measuring the read-out write signal as a read signal.

Recently, a magnetic head in which a micro actuator (MA) is mounted as a new technology for higher concentration of the recording density of a hard disk has come into practical use. A magnetic head is mounted at the tip of a suspension, where the magnetic head is constituted by a slider 4c, a write element 4a and a read element (MR element) 4b, as shown in FIG. 21. A conventional system where these elements are moved together with the suspension for following the track cannot be no longer untreatable in the system having narrower tracks. Therefore, as shown in FIGS. 16 and 17, such an idea has been proposed that a small actuator which is called a micro actuator (MA) 6 is mounted at the tip of the suspension (or it may be provided at the root of the suspension) so as to facilitate following of the track by moving only the magnetic head 4.

It has become necessary for manufactures of the magnetic head 4 to measure the performance of the micro actuator 6 in addition to the characteristics of the conventional magnetic head 4 itself. As a typical measurement item, there is a static operational characteristic, and in order to obtain the characteristic, a relationship between a movement distance and a control voltage is measured by applying a control voltage Vc to the micro actuator 6 to determine the amount of distance by which the magnetic head 4 has moved, as shown in FIG. 18. A method for measuring the movement distance X of the micro actuator 6 according to a prior art therefor will be described in detail hereinafter.

First of all, the magnetic head 4 and a suspension 8 (referred to, as a whole, as a head gimbal assembly (HGA)) attached to an attachment jig 9b as shown in FIG. 19. The attachment jig 9b is attached to the top of a piezo-electric stage 9a, and the piezo-electric stage 9a has an ability for moving in a direction the same as that of the micro actuator 6. In addition, the movement distance of the piezo-electric stage 9a is calibrated, and therefore, can be precisely obtained. Then, as shown in FIG. 20, the magnetic head 4 is placed on the hard disk 1, and signal data is written in the track 202. Writing the same signal data is executed by the write element 4a of the magnetic head 4 (See FIG. 21).

As shown in FIGS. 23A to 23H, the magnetic head 4 is moved by movement of the piezo-electric stage 9a after signal data for one round of the track is written thereon. In order to perform this operation, it usually takes time required for several rounds of the hard disk 1, however, it is set to one round of the hard disk 1 in the example of FIGS. 23A to 23H. After the magnetic head 4 has moved to a desired location, the read element carries out reading out of data in the third round. In this case, usually, only the output amplitude TAA is measured. The average value of the output amplitude for one round of the track is called TAA as described above, and the TAA which is obtained in the third round is referred to as TAA (1). At the next round, the magnetic head 4 is moved to the next location by movement of the piezo-electric stage 9a, and the TAA is measured for the next round, which is referred to as TAA (2). In the same manner, TAA data at N points are measured, and then, a graph showing positions of the piezo-electric stage 9a on the horizontal axis and the TAA on the vertical axis is referred to as a track profile characteristic (FIG. 24). The following measurement is performed using this track profile characteristic as a reference.

From the track profile characteristic, a relative position of the read element 4b to the write element 4a can be seen. This relative position is designated by a dotted line of FIG. 24, and usually, has a finite value, which is called a read/write offset, since the read element 4b is not necessarily located at the same position as that of the write element 4a. In the above-mentioned operation, measurement is carried out at the reference position without application of any control voltage Vc to the micro actuator 6, namely, Vc=0V is applied thereto.

Next, as shown in FIGS. 25A to 25D, a predetermined control voltage Vc (1) is applied to the micro actuator 6, and in response to this, the micro actuator 6 moves. In this state, the track data is written. The written track 202 is located at a position shifted by the movement distance of the micro actuator 6 from the reference position. After that, the control voltage Vc which is applied to the micro actuator 6 is returned to 0V, so that the position of the micro actuator 6 is returned to the reference position. In the same manner as above, the track profile characteristic is measured while moving the piezo-electric stage 9a. The track profile characteristic TPF (1) obtained herein is shifted, as shown in FIG. 26, as compared with the above-measured track profile characteristic TPF (2). This shift is due to the movement of the micro actuator 6 by the applied control voltage Vc upon writing of the track 202, and therefore, by comparing the shift with the reference track profile characteristic TPF (2), the amount of movement of the micro actuator 6 can be found at the time of writing. The shift of the center of this characteristic (namely, the shift "C2-C1" from the position (center) of the read/write offset) is measured as X (1).

In the same manner, by measuring the movement distances X (1), X (2), X (3), . . . , X (M) of the total number of M points of the control voltage Vc while changing the control voltage Vc applied to the micro actuator 6 such as Vc (2), Vc (3), . . . , V (M), a desired characteristic of the movement distance relative to the control voltage can be obtained, as shown in FIG. 27.

The measuring method of the static characteristic of the micro actuator 6 according to the prior art is mentioned above, however, a method for obtaining the same characteristic may be considered by fixing the write element 4a at a predetermined reference position, by moving the micro actuator 6 with application of the control voltage Vc upon reading out of the track data, and by measuring the characteristic of the movement distance relative to the control voltage in the same manner using the piezo-electric stage 9a.

According to the measuring method of the track profile of the prior art, the time for one round of the hard disk is required in order to measure the TAA of one point. For example, when the hard disk is rotated at a speed of 6000 rpm, a time of 10 ms is required. In order to obtain the value of the movement distance X (i) with a sufficient precision of the characteristic of the movement distance relative the control voltage, the minimum N=20 is required. In addition, the number of points of control voltages Vc for which the movement distances X of the micro actuator 6 are measured is not clearly defined, however, the measurements for ten control voltages Vc, for example, are considered to be necessary in order to measure the characteristic of the movement distance to voltage in a schematic graph form. In this case, the time for 20×2×10 rounds is required at a minimum. When the rotation speed of the hard disk is set to 6000 rpm, the time required becomes 4 seconds. This is a long time which cannot be permitted for the throughput in competitive manufacturing line where several tenths of a second become critical. In other words, there is such a problem that an extremely large time is required for measuring the characteristic of the movement distance X of the micro actuator 6 relative to the control voltage Vc of the micro actuator 6 (hereinafter referred to as a characteristic of the movement distance to voltage).

SUMMARY OF THE INVENTION

An essential object of the present invention is therefore to provide a measuring apparatus and a measuring method for use in a recording unit, capable of shortening the time of measurement as compared with that of the prior art, upon measuring the characteristics of the control voltage to the movement distance of the recording unit.

In order to achieve the aforementioned objective, according to one aspect of the present invention, a measuring apparatus for measuring performance characteristics of a recording unit including a circular recording medium on which one track is divided into a plurality of sectors, the recording unit recording a data signal on the recording medium by using a magnetic head, the measuring apparatus comprising:

mechanism means for moving the magnetic head in a direction substantially perpendicular to a circumferential direction of the recording medium in response to a control signal;

writing means for writing a write signal for respective sectors while moving the magnetic head by outputting the control signal having different levels corresponding to respective sectors to the mechanism means; and reading means for reading out the write signal written by the writing means, and for measuring a read-out write signal as a read signal relative to a position of the magnetic head.

In the above-mentioned apparatus, the reading means preferably measures characteristics of the read signal relative to the position of the magnetic head for respective sectors, by reading out the write signal written by the writing means for respective sectors while moving the magnetic head by changing the level of the control signal each time of one-round rotation of the recording medium, and by measuring the read-out write signal as a read signal relative to the position of the magnetic head.

The above-mentioned apparatus preferably further comprises calculating means for calculating the position of the magnetic head corresponding to a maximum value of the read signal for respective sectors based on the measured characteristics of the read signal relative to the position of the magnetic head for respective sectors, and for measuring characteristics of the position of the magnetic head relative to the level of the control signal based on a calculated position of the magnetic head for respective sectors.

In the above-mentioned apparatus, the writing means preferably generates a plurality of Sector trigger signals corresponding to the plurality of sectors by multiplying a frequency of an Index signal generated each time of one-round rotation of the recording medium, and for writing write signals for respective sectors based on the plurality of Sector trigger signals.

In the above-mentioned apparatus, the writing means preferably generates respective timing signals delayed respectively by a plurality of predetermined delay times from an Index signal generated each time of one-round rotation of the recording medium, and for writing write signals for respective sectors based on the respective timing signals.

In the above-mentioned apparatus, the mechanism means preferably comprises a micro actuator and a piezo-electric stage.

According to another aspect of the present invention, there is provided a measuring method for measuring performance characteristics of a recording unit including a circular recording medium on which one track is divided into a plurality of sectors, the recording unit recording a data signal on the recording medium by using a magnetic head, the measuring method including the steps of:

moving the magnetic head in a direction substantially perpendicular to a circumferential direction of the recording medium in response to a control signal by using mechanism means;

writing a write signal for respective sectors while moving the magnetic head by outputting the control signal having different levels corresponding to respective sectors; and reading out the written write signal, and for measuring a read-out write signal as a read signal relative to a position of the magnetic head.

In the above-mentioned method, the reading step preferably includes a step of measuring characteristics of the read signal relative to the position of the magnetic head for respective sectors, by reading out the written write signal for respective sectors while moving the magnetic head by changing the level of the control signal each time of one-round rotation of the recording medium, and by measuring the read-out write signal as a read signal relative to the position of the magnetic head.

The above-mentioned method preferably further includes a step of calculating the position of the magnetic head corresponding to a maximum value of the read signal for respective sectors based on the measured characteristics of the read signal relative to the position of the magnetic head for respective sectors, and for measuring characteristics of the position of the magnetic head relative to the level of the control signal based on a calculated position of the magnetic head for respective sectors.

In the above-mentioned method, the writing step preferably includes a step of generating a plurality of Sector trigger signals corresponding to the plurality of sectors by multiplying a frequency of an Index signal generated each time of one-round rotation of the recording medium, and writing write signals for respective sectors based on the plurality of Sector trigger signals.

In the above-mentioned method, the writing step preferably includes a step of generating respective timing signals delayed respectively by a plurality of predetermined delay times from an Index signal generated each time of one-round rotation of the recording medium, and writing write signals for respective sectors based on the respective timing signals.

In the above-mentioned method, the mechanism means preferably comprises a micro actuator and a piezo-electric stage.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which:

FIG. 2 is a block diagram showing a construction of a trigger distribution module 30 of FIG. 1;

FIG. 3 is a block diagram showing a construction of a write controlling module 31 of FIG. 1;

FIG. 4 is a block diagram showing a construction of a read controlling module 32 of FIG. 1;

FIGS. 23A, 23B, 23C, 23D, 23E, 23F, 23G and 23H are plan views of a periphery of a track 202 showing a measuring method for measuring an output amplitude TAA according to a prior art;

FIG. 28 is a plan view showing a plurality of tracks 203-1 to 203-M drawn by the measuring method of a preferred embodiment according to the present invention; and FIGS. 29A, 29B and 29C are a view and graphs showing a measuring method of the preferred embodiment according to the present invention, where FIG. 29A is a view showing a plurality of segments 203-1 to 203-M when each TAA is measured while moving the magnetic head 4 by controlling the micro actuator 6 for each round, FIG. 29B is a graph showing the TAA of each round measured by a method of FIG. 29A, and FIG. 29C is a graph showing a characteristic of the movement distance X of the micro actuator 6 measured by a method of FIG. 29B.

DETAILED DESCRIPTION OF THE PREFERRED EMBODIMENTS

The preferred embodiments according to the present invention will be described below with reference to the attached drawings.

A measuring apparatus for a recording unit including a circular recording medium such as a hard disk and components such as a magnetic head for recording a data signal on the above recording medium according to a preferred embodiment of the present invention will be described below with reference to the drawings.

Figure 11:
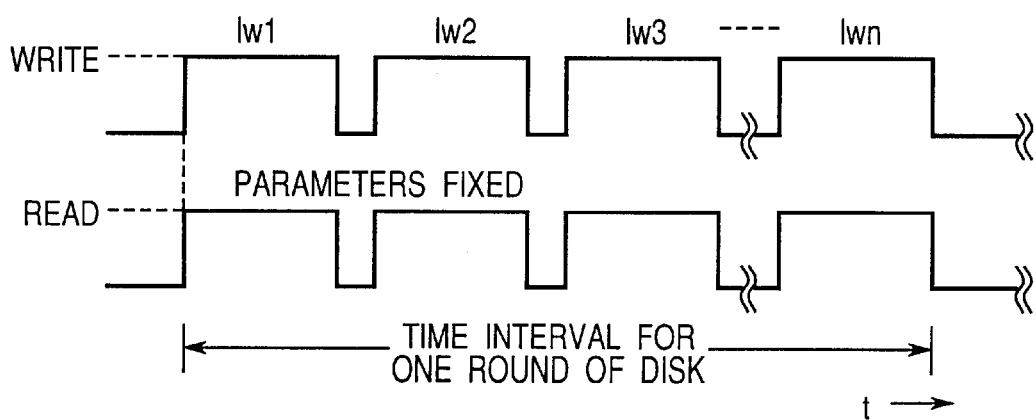
FIG. 11 is a timing chart showing a first example of write and read according to the measuring method of the preferred embodiment.
Figure 12:
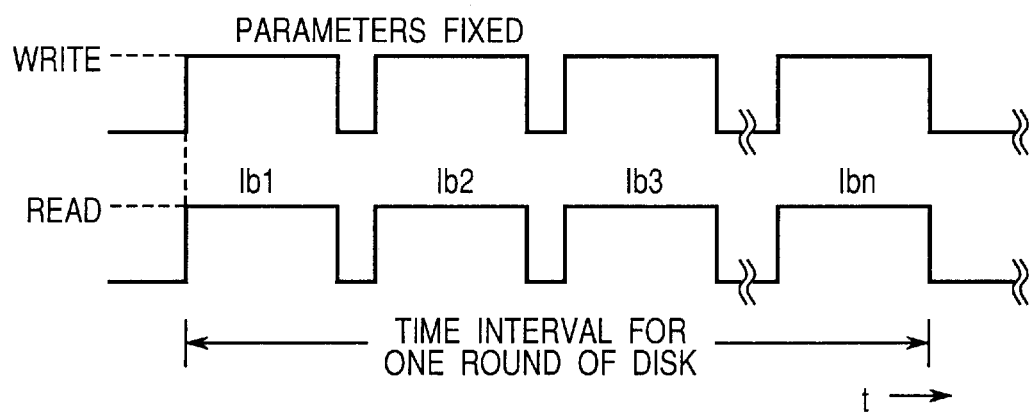
FIG. 12 is a timing chart showing a second example of write and read operation according to the measuring method of the preferred embodiment.
Figure 14:
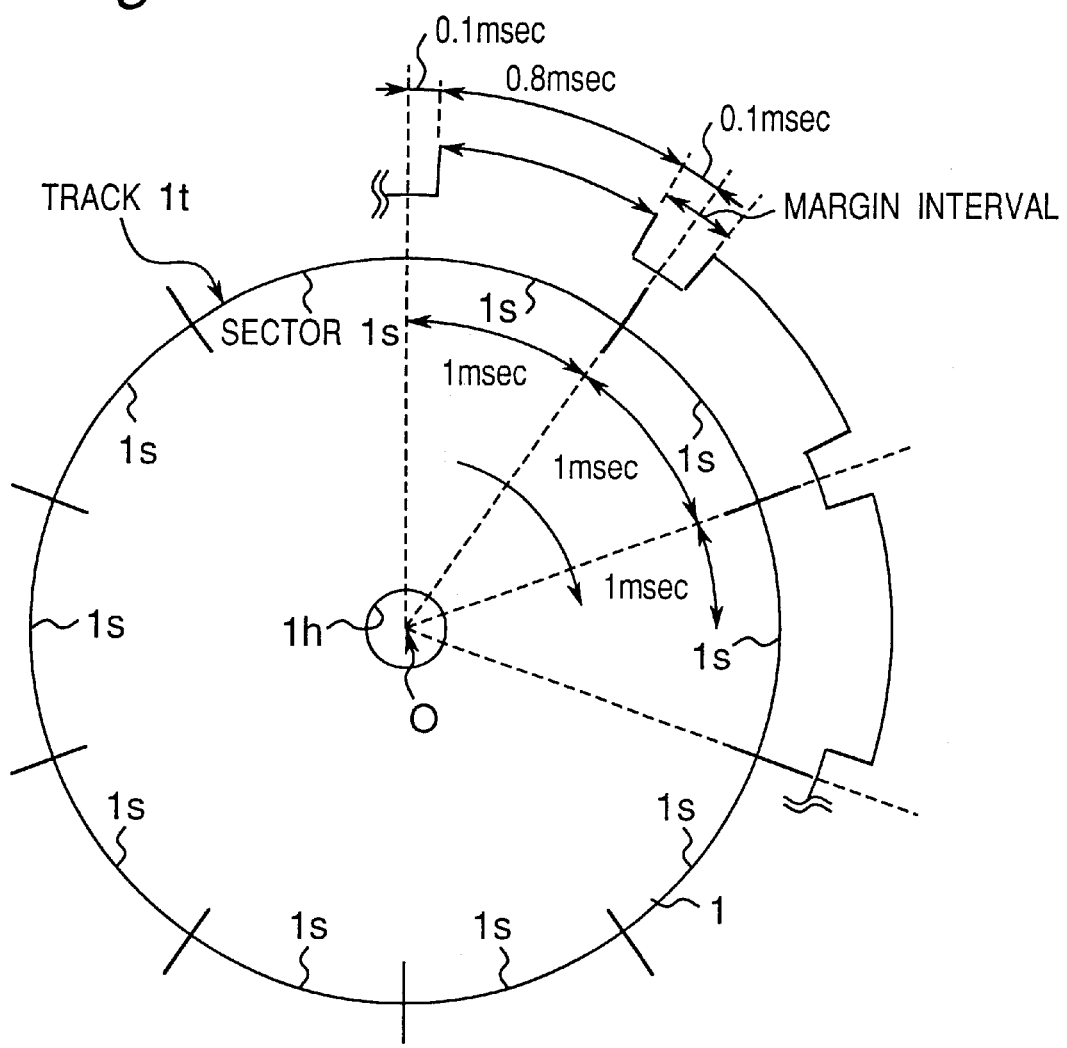
FIG. 14 is a plan view showing a process on a track of a hard disk according to the operation example of FIG. 13.

The measuring apparatus for use in the recording unit according to the preferred embodiment of the present invention is characterized in that, as shown in FIG. 14, a higher speed measurement than that of the prior arts is achieved by dividing one track it on a hard disk into, for example, ten sectors 1s and executing a measurement with a parameter value changed for respective sectors 1s, that is, executing a measurement so that one measurement is completed for each sector 1s . Upon measuring the dependency characteristic of each performance evaluation items when the parameter value is changed, a write parameter (for example, a write current Iw) is changed for respective sectors of a time interval for one round of the disk with the read parameter value fixed as shown in FIG. 11 or a read parameter (for example, MR head bias current Ib) is changed with the write parameter value fixed as shown in FIG. 12.

Furthermore, due to such an arrangement that the respective sectors are arranged in different physical positions in the hard disk, a non-uniformity of the characteristics of the hard disk causes an error in the measured value. For the purpose of compensating for this, a more correct measured value can be obtained by using the measured value obtained with the fixed parameter for respective sectors (where the fixed parameter is the write parameter or the read parameter) as a reference value or a reference signal, and correcting a measured value obtained with the parameter changed for respective sectors (where the parameter to be changed is the read parameter or the write parameter) through collating or checking the measured value with the above reference value.

That is, concretely speaking, a write signal is written with a write parameter fixed for respective sectors, and thereafter, the write signal is read out with a read parameter fixed for respective sectors to measure the read-out signal as a reference read signal having a reference value. In order to measure the read-out signal as a reference read signal having a reference value, next, the write signal is written with a write parameter value changed for respective sectors, and thereafter the write signal is read out with the write parameter fixed for respective sectors. Thereafter, correction is executed by a predetermined correcting method based on the reference read signal having the reference value and the measured read signal having the measured value, then the measured value obtained after the correction, namely, the corrected value is calculated by a minus controller 20 and is outputted to a CRT display 22 or a printer 23 (See FIG. 1).

Otherwise, the write signal is written with a write parameter fixed for respective sectors, and thereafter, the write signal is read out with a read parameter fixed for respective sectors to measure the read-out signal as a reference read signal having a reference value. Next, the write signal is read out with a read parameter value changed for respective sectors. Then, correction is executed by a predetermined correcting method based on the reference read signal having reference value and the measured read signal having the measured value, and the measured value obtained after the correction, namely, the corrected value is calculated by the main controller 20, and then, is outputted to the CRT display 22 or the printer 23 (See FIG. 1).

As a method for calculating the measured value obtained after the correction, as shown in Table 1, there is a method of executing a division calculation which is dividing the reference value measured with the fixed parameter by the measured value, and using the result of the division calculation as a corrected measured value. However, the calculating formula of the present invention is not limited to this.

TABLE 1

|  | Sector No. | | | | | |
| --- | --- | --- | --- | --- | --- | --- |
|  | 1 | 2 | 3 | 4 | ... | N |
| Reference Value | $R_1$ | $R_2$ | $R_3$ | $R_4$ | ... | $R_N$ |
| Measured Value | $M_1$ | $M_2$ | $M_3$ | $M_4$ | ... | $M_N$ |
| Value After Correction | $M_1/R_1$ | $M_2/R_2$ | $M_3/R_3$ | $M_4/R_4$ | ... | $M_N/R_N$ |

Figure 1:
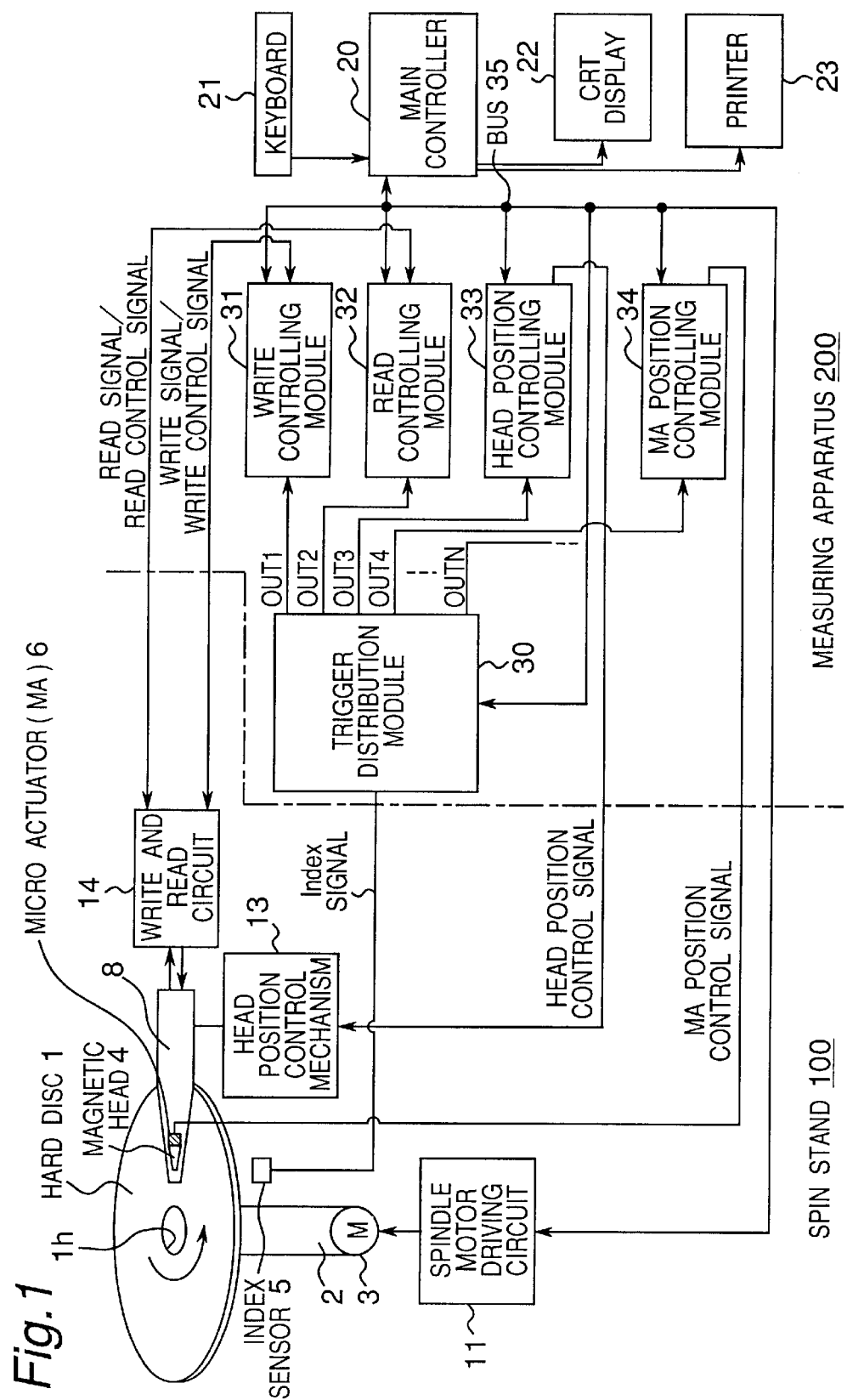
FIG. 1 is a block diagram showing a construction of a spin stand 100 and a measuring apparatus 200 for use in the spin stand 100 according to a preferred embodiment of the present invention.
Figure 7:
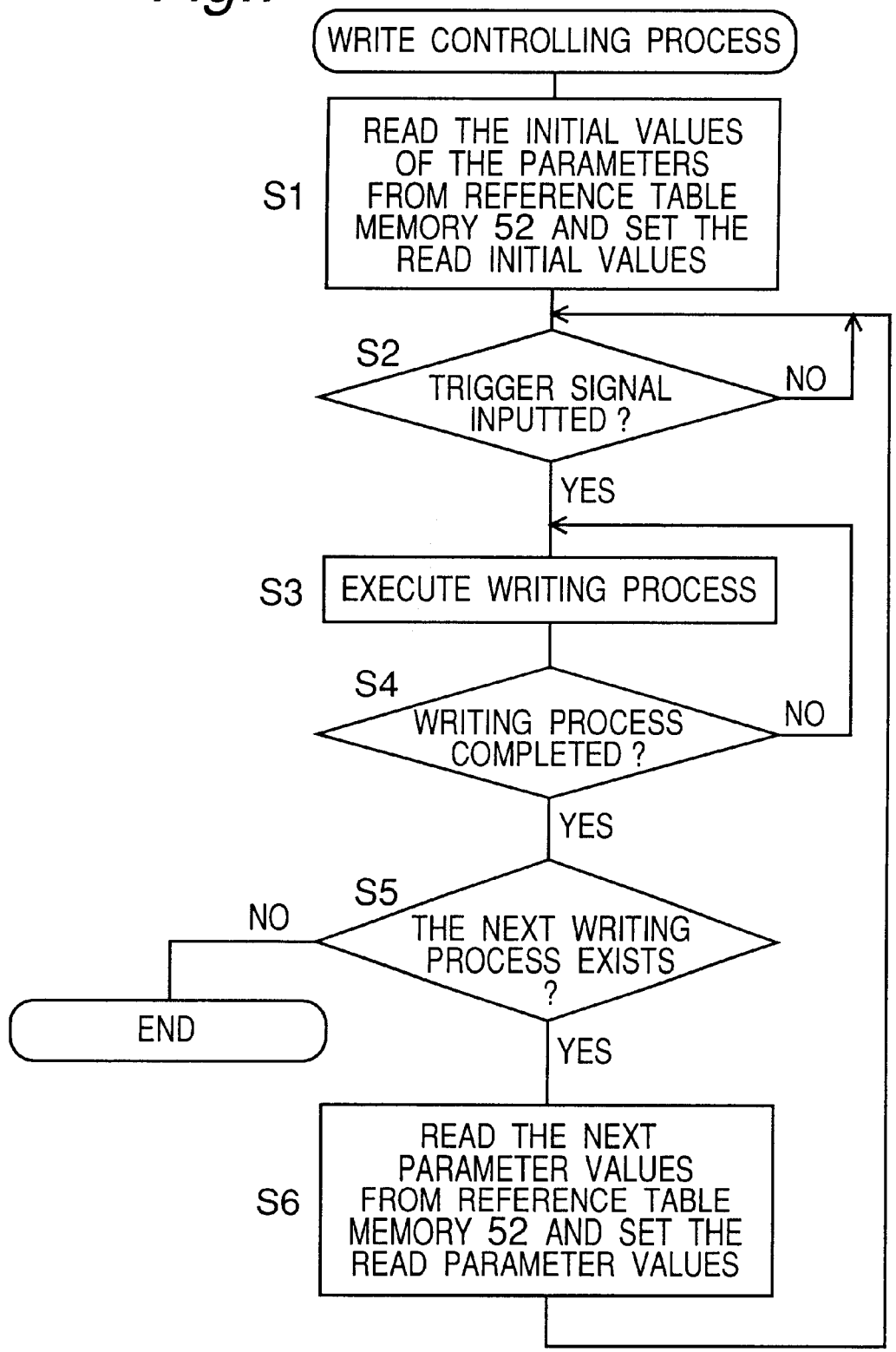
FIG. 7 is a flow chart showing a write controlling process which is executed by the write controlling module 31 of FIG. 3.

FIG. 1 is a block diagram showing a construction of a spin stand 100 and a measuring apparatus 200 for the spin stand 100 according to a preferred embodiment of the present invention. The measuring apparatus 200 shown in FIG. 1 is characterized by being constructed as follows. Referring to FIG. 1, one Index signal is outputted from an index sensor 5 for one round of a hard disk 1 when a spindle 2 is rotated by one round, while a trigger distribution module 30 generates one index trigger signal (alternately referred to as an Index signal hereinafter) in response to the Index signal or a plurality of Sector trigger signals (alternately referred to as a Sector signal, and the Index trigger signal and the Sector trigger signal are collectively referred to as a trigger signal, hereinafter) corresponding to the sectors of the disk 1, and then, outputs the same signals to a write controlling module 31, a read controlling module 32, a head position controlling module 33, and an MA position controlling module 34, respectively, (the position of the micro actuator 6 is referred to as an MA position hereinafter). The write controlling module 31 executes a write controlling process as shown in FIG. 7 in response to the trigger signal, thereby executing a writing process for measurement of the hard disk 1.

Figure 8:
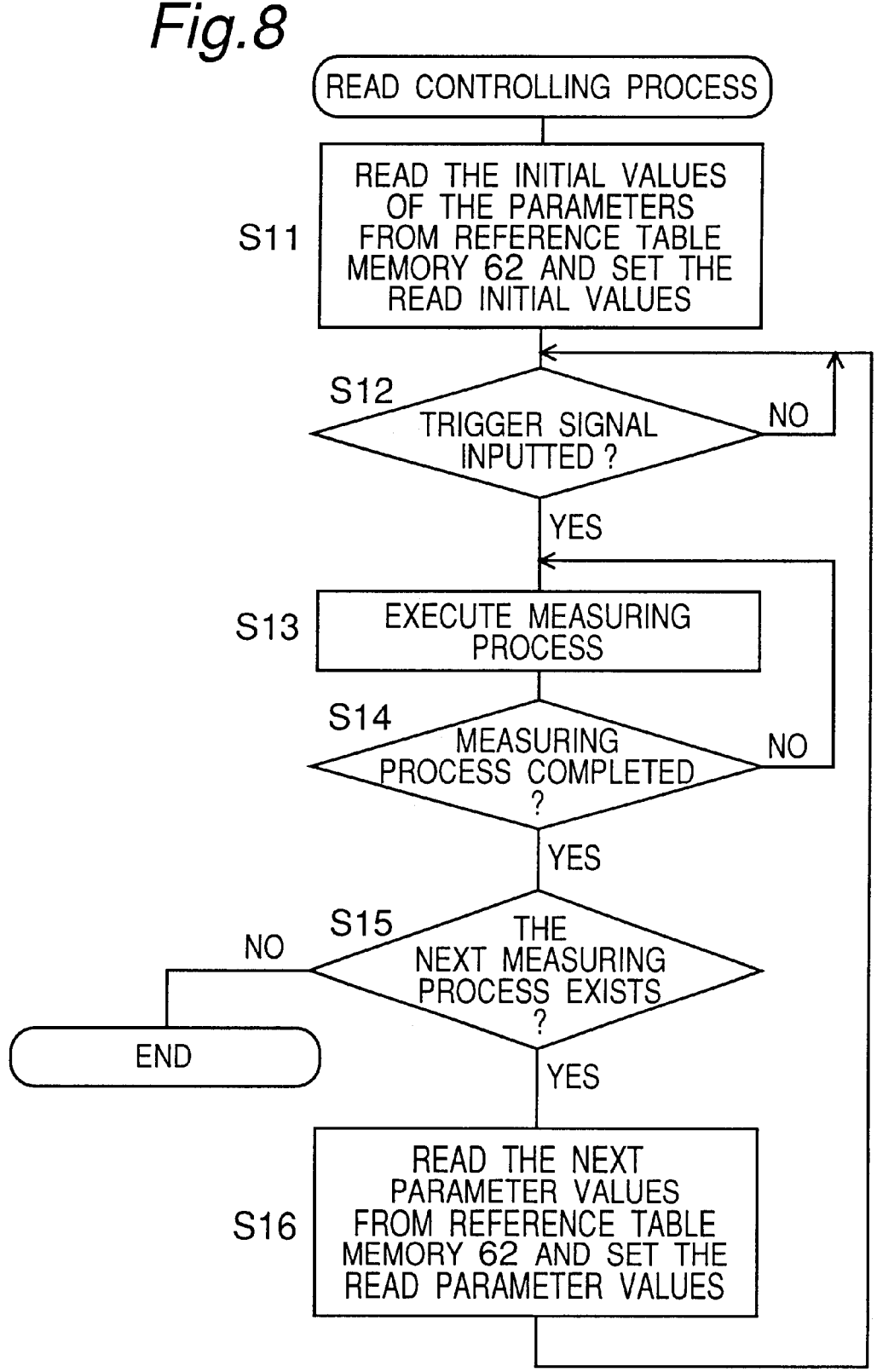
FIG. 8 is a flow chart showing a read controlling process which is executed by the read controlling module 32 of FIG. 4.
Figure 9:
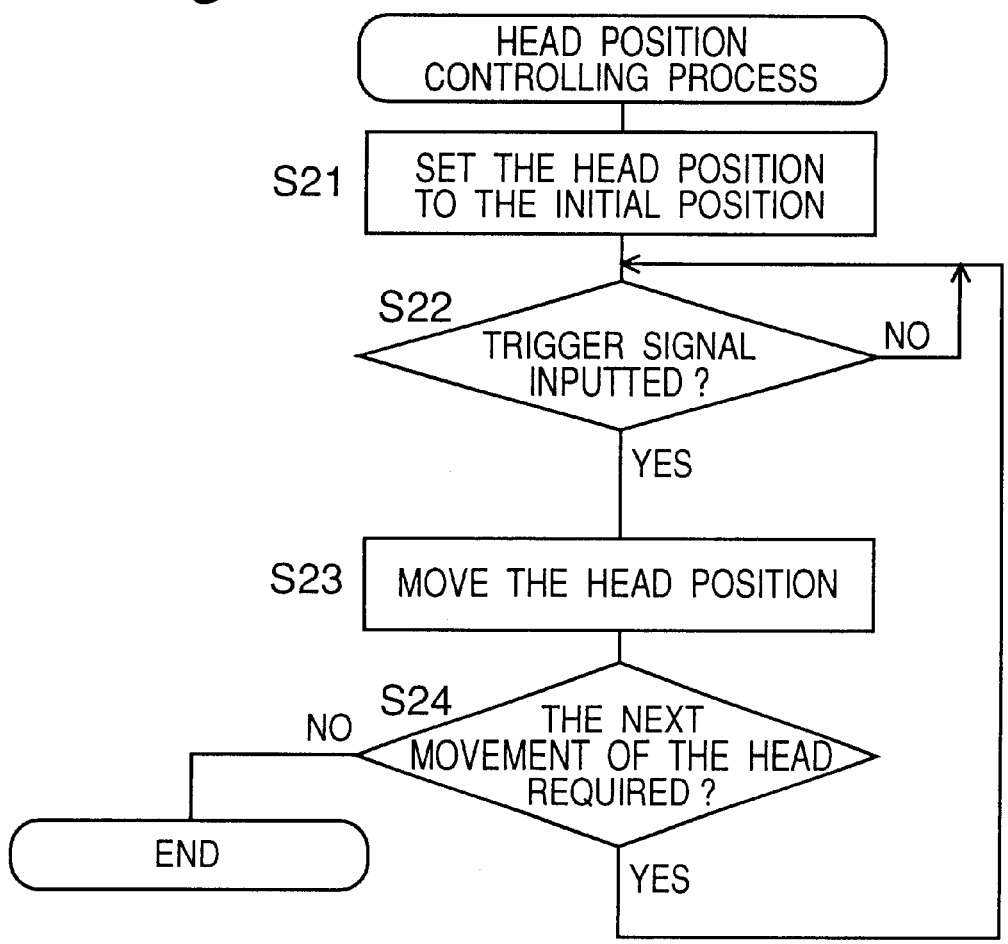
FIG. 9 is a flow chart showing a head position controlling process which is executed by the head position controlling module 33 of FIG. 5.
Figure 10:
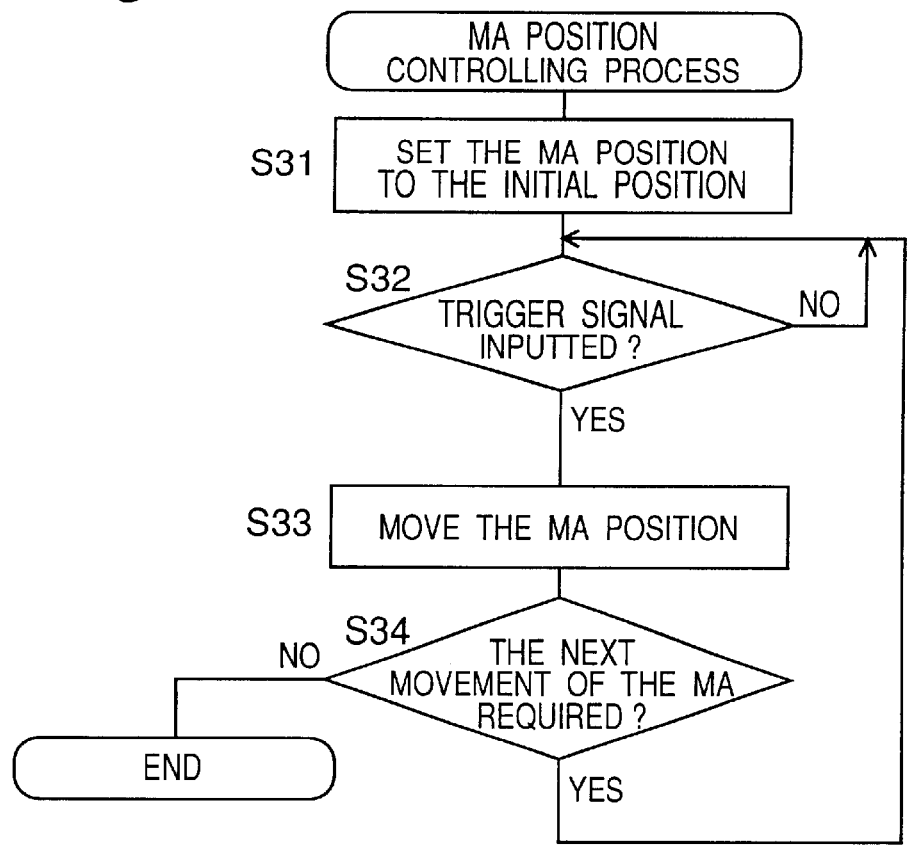
FIG. 10 is a flow chart showing an MA position controlling process which is executed by the MA position controlling module 34 of FIG. 6.

The read controlling module 32 executes a read controlling process as shown in FIG. 8 in response to the trigger signal, thereby, executing a reading process for measurement of the hard disk 1. The head position controlling module 33 executes a head position controlling process as shown in FIG. 9 in response to the trigger signal, thereby executing a head position controlling process for measurement of the hard disk 1. The MA position controlling module 34 executes an MA position controlling process as shown in FIG. 10 in response to the trigger signal, thereby executing an MA position controlling process for measurement of the hard disk 1.

The spin stand 100 shown in FIG. 1 is mainly provided with the following four components:

(a) a spindle 2 for supporting the hard disk 1, a spindle motor 3 for driving the spindle 2 to rotate the spindle 2, and a spindle motor driving circuit 11 for controlling the spindle motor 3;

(b) a head positioning control mechanism comprising a head position controlling mechanism 13 and a micro actuator 6;

(c) a write and read circuit 14; and (d) an index sensor 5.

In this case, the spindle 2 is inserted into a center hole 1h of the hard disk 1 which serves as a magnetic recording medium so as to support the hard disk 1, and then, the spindle motor 3 is connected to the spindle 2. With the rotation of the spindle motor 3, the spindle 2 is rotated to rotate the hard disk 1. In this case, when the spindle 2 is rotated to rotate the hard disk 1, one Index signal is detected and generated per rotation by the index sensor 5, and the Index signal is outputted to the trigger distribution module 30 of the measuring apparatus 200. The rotation of the spindle motor 3 is controlled by the main controller 20 and its rotation speed is normally unchanged once it is set.

Figure 16:
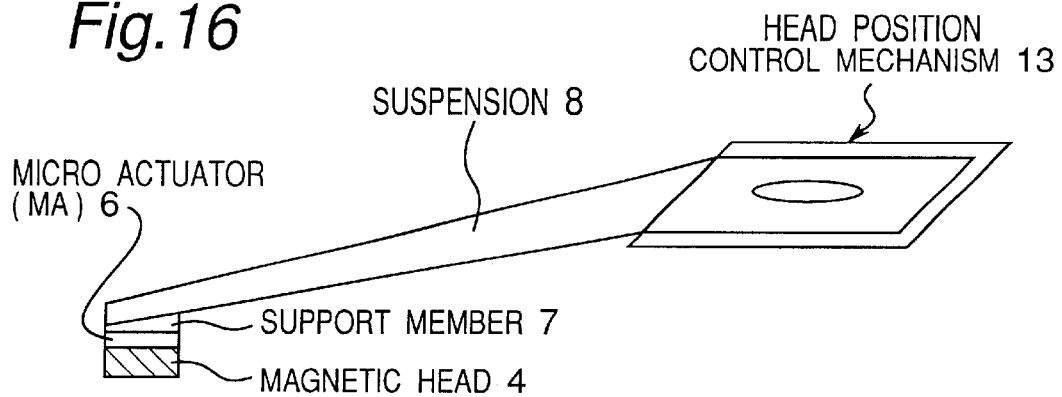
FIG. 16 is a perspective view showing a construction of a mechanism from a head position control mechanism 13 to a magnetic head 4 shown in FIG. 1.
Figure 17:
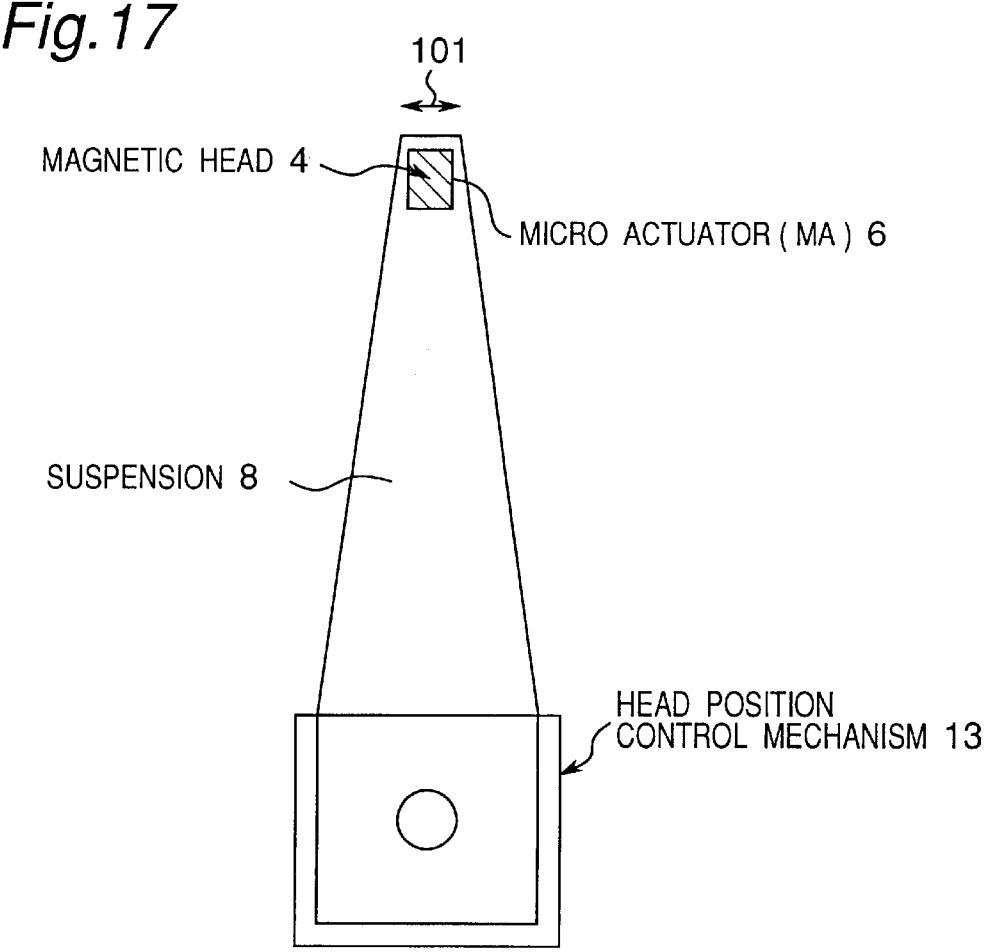
FIG. 17 is a plan view showing a construction of a mechanism from the head position control mechanism 13 to the magnetic head 4 shown in FIG. 1.
Figure 18:
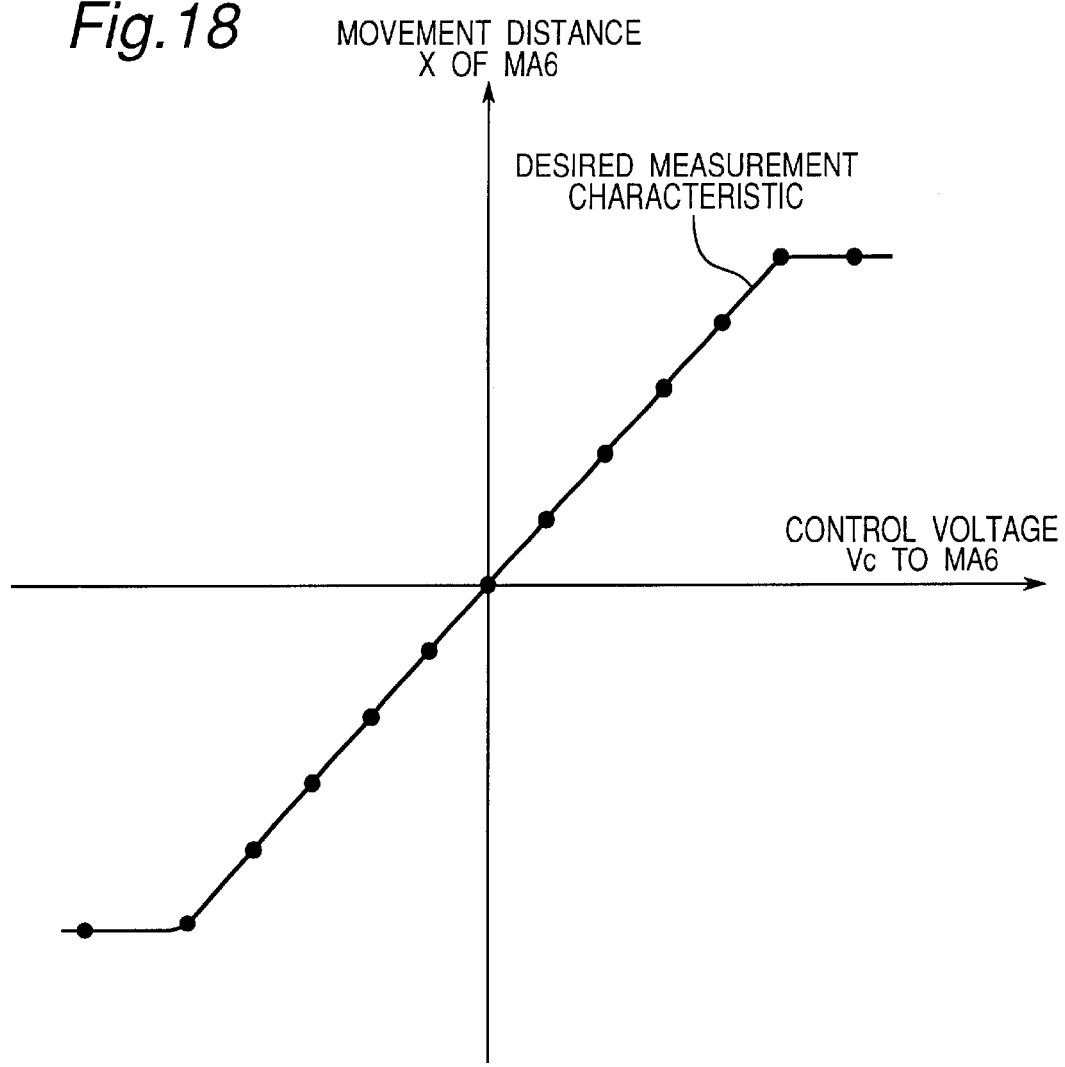
FIG. 18 is a graph showing a characteristic of movement distance X of a micro actuator 6 relative to a control voltage Vc applied to the micro actuator 6, which is a desired characteristic measured in the present preferred embodiment.
Figure 19:
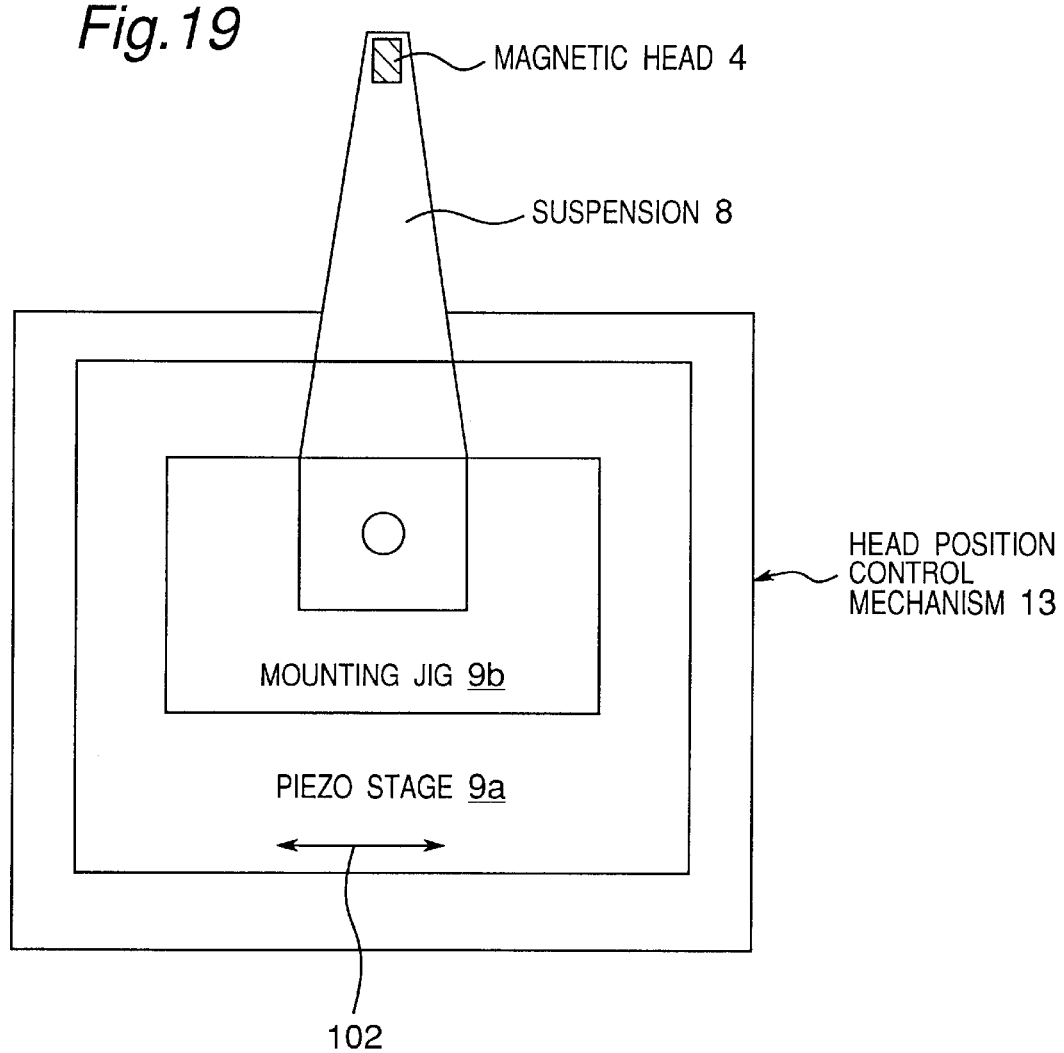
FIG. 19 is a plan view showing a detailed construction of the head position control mechanism 13 shown in FIG. 1.

The above-mentioned head positioning control mechanism is mainly divided into two sections. One is a rough positioning mechanism comprised of an X-Y stage or the like and another one is a fine positioning mechanism which is constituted by a piezo-electric stage 9a shown in FIG. 19, the micro actuator (MA) 6 shown in FIGS. 16 and 17 and the like. Although the rough positioning mechanism is not shown since it has no direct relation to the present invention, the rough positioning mechanism is controlled by the main controller 20. The head position control mechanism 13 shown in FIG. 1 indicates the above-mentioned fine positioning mechanism, and it operates to finely adjust the position of a magnetic head 4 required for measurement of track profile characteristics and so on. The operation of the head position control mechanism 13 is controlled by the head position controlling module 33. In addition, the operation of micro actuator 6 is controlled by the MA position controlling module 34. In this case, the magnetic head 4 is provided at the tip of the suspension 8 via a support member 7 and the micro actuator 6 as shown in FIG. 16, and finely moves in the right and left directions of FIG. 17 (which is indicated by a direction of an arrow 101: this is the direction substantially perpendicular to a circumferential direction of coaxial tracks on the circular hard disk 1) by the operation of the micro actuator 6 as shown in FIG. 17. In this case, the magnetic head 4 is supported so as to move in a radial direction, in a direction perpendicular to the radial direction and approximately in a vertical direction relative to the track of the hard disk 1 so that the magnetic head 4 can be electromagnetically coupled with the surface of the hard disk 1 in a non-contact manner. The position of the magnetic head 4 is controlled by the above-mentioned head position control mechanism 13 and the micro actuator 6 connected to the magnetic head 4.

The write and read circuit 14 receives a write signal and a control signal from the read controlling module 32 and the write controlling module 31 of the measuring apparatus 200, and then, executes a predetermined operation as described in detail later.

The measuring apparatus 200 is roughly provided with the trigger distribution module 30, the write controlling module 31, the read controlling module 32, the head position controlling module 33, and the MA position controlling module 34, in addition to the main controller 20 for controlling the operations of the controlling modules 30 to 34, a keyboard 21 which serves as an input means, and the CRT display 22 and the printer 33 which serve as output means. The controlling modules 30 to 34 are connected to the main controller 20 of the measuring apparatus 200 via a bus 35, and the main controller 20 starts its operation according to instruction data issued by an operator from the keyboard 21 connected to the main controller 20, so as to control the controlling modules 30 to 34, execute the above-mentioned correcting or compensating process based on the data of measurement results outputted from the read controlling module 32, display the data of the measurement results and the data obtained after the correcting or compensating process on the CRT display 22, and output the data to the printer 23, thereby printing the data.

The write controlling module 31 generates not only a write signal but also a write control signal including the setting of a write current, a write timing signal and so on, and then outputs these signals to the write and read circuit 14. The write signal is subjected to a modulation process or the like if necessary in the write and read circuit 14, and then, a processed write signal is written into the hard disk 1 via the magnetic head 4. In this stage, a predetermined write parameter value is given to the write and read circuit 14 by the inputted write control signal.

The read controlling module 32 not only receives a read signal inputted from the magnetic head 4 via the write and read circuit 14, but also generates a read control signal of MR bias current setting, read timing and so on required for reading out, and then, outputs these signals to the write and read circuit 14. In this case the read signal from the magnetic head 4 is subjected to an amplifying process and so on if necessary in the write and read circuit 14, and then, a processed read signal is inputted to the read controlling module 32. Further, a predetermined read parameter value is given to the write and read circuit 14 by the read control signal.

FIG. 2 is a block diagram showing a construction of the trigger distribution module 30 shown in FIG. 1. Referring to FIG. 2, the Index signal from the trigger distribution module 30 is inputted to the controller 40 and a frequency multiplier 42, and then, in response to the inputted Index signal, the controller 40 generates selecting signals Select 1, Select 2, . . . , Select N for executing switching between switches over SW1a, SW2a, SW3a, SW4a, . . . and the control of turning on and off switches SW1b, SW2b, SW3b, SW4b, . . . with reference to operation processing data of a reference table stored in the reference table memory 41, and then, outputs these signals to the switches SW1a, SW1b, SW2a, SW2b, SW3a, SW3b, SW4a, SW4b, . . . . Further, the Index signal is outputted as a trigger signal OUT1 to the write controlling module 31 via the a-contact of the switch SW1a and the switch SW1b, and further, the Index signal is outputted as a trigger signal OUT2 to the read controlling module 32 via the a-contact of the switch SW2a and the switch SW2b. Furthermore, the Index signal is outputted as a trigger signal OUT3 to the head position controlling module 33 via the a-contact of the switch SW3a and the switch SW3b, and the Index signal is also outputted as a trigger signal OUT4 to the MA position controlling module 34 via the a-contact of the switch SW4a and the switch SW4b.

The frequency multiplier 42 multiplies the frequency of the inputted Index signal by, for example, ten to generate a Sector signal corresponding to each sector 1s obtained after the multiplication, and then outputs the Sector signal as the trigger signal OUT1 to the write controlling module 31 via the b-contact of the switch SW1a and the switch SW1b. Also, the Sector signal is outputted as the trigger signal OUT2 to the read controlling module 32 via the b-contact of the switch SW2a and the switch SW2b. Further, the Sector signal is outputted as the trigger signal OUT3 to the head position controlling module 33 via the b-contact of the switch SW3a and the switch SW3b. Furthermore, the Sector signal is outputted as the trigger signal OUT4 to the MA position controlling module 34 via the b-contact of the switch SW4a and the switch SW4b.

FIG. 3 is block diagram showing a construction of the write controlling module 31 shown in FIG. 1. Referring to FIG. 3 a controller 50 is a control circuit which controls the operation of the write controlling module 31 and is connected to the main controller 20 via the bus 34. In response to the trigger signal OUT1, with reference to the operation processing data of the reference table stored in a reference table memory 52, the controller 50 controls the following:

(a) a parameter setting section 51, which is provided with a D/A (digital-to-analog) converter (not shown) for setting with parameters such as a write current, and a timer (not shown) for determining the measurement time, and which controls the operation of a write control executing section 53, and (b) the write control executing section 53 which is connected to the write and read circuit 14, thereby executing a write controlling process shown in FIG. 7 and executing a writing process for the spin stand 100.

FIG. 4 is a block diagram showing a construction of the read controlling module 32 shown in FIG. 1. Referring to FIG. 4 a controller 60 is a control circuit which controls the operation of the read controlling module 32 and is connected to the main controller 20 via the bus 35. In response to the trigger signal OUT2, with reference to the operation processing data of the reference table stored in a reference table memory 62, the controller 60 controls the following:

(a) a parameter control section 61, which is provided with a D/A converter (not shown) for setting the read parameter and a timer (not shown) for determining the measurement time, and which controls the operation of a read control executing section 63, and (b) the read control executing section 63 connected to the write and read circuit 14, thereby executing a read controlling process shown in FIG. 8 and executing a reading process for the spin stand 100.

Figure 5:
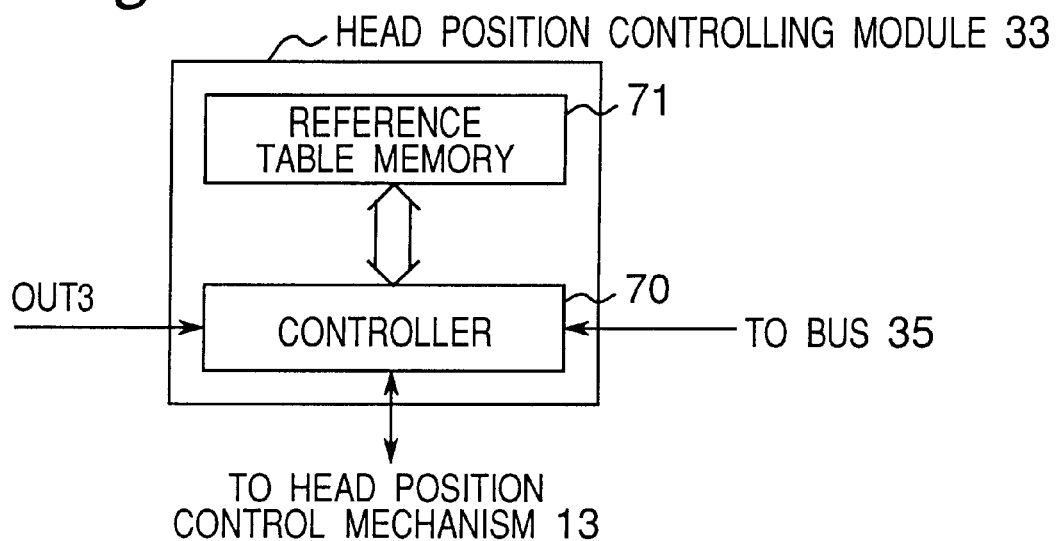
FIG. 5 is a block diagram showing a construction of a head position controlling module 33 of FIG. 1.

FIG. 5 is a block diagram showing a construction of the head position controlling module 33 shown in FIG. 1. Referring to FIG. 5 a controller 70 is a control circuit which controls the operation of the head position controlling module 33 and is connected to the main controller 20 via the bus 35. In response to the trigger signal OUT3, with reference to the operation processing data of the reference table stored in a reference table memory 71, the controller 70 controls the head position control mechanism 13 via the bus 35, thereby executing the head position controlling process shown in FIG. 9 and executing the controller process of the position of the magnetic head 4 for the spin stand 100.

Figure 6:
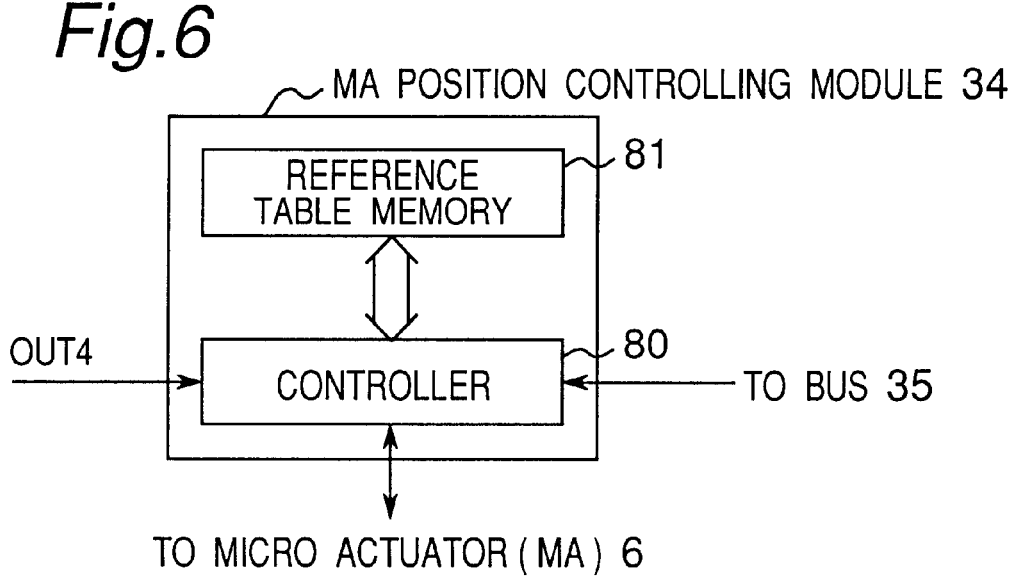
FIG. 6 is a block diagram showing a construction of an MA position controlling module 34 of FIG. 1.

FIG. 6 is a block diagram showing a construction of the MA position controlling module 34 shown in FIG. 1. Referring to FIG. 6, a controller 80 is a control circuit which controls the operation of the MA position controlling module, 34 and is connected to the main controller 20 via the bus 35. In response to the trigger signal OUT4, with reference to the operation processing data of the reference table stored in a reference table memory 81, the controller 80 controls the micro actuator 6 via the bus 35, thereby executing the MA position controlling process shown in FIG. 10 and executing the controlling process of the position of the micro actuator 6 (namely, the MA position) for the spin stand 100.

FIG. 7 is a flow chart showing a write controlling process which is executed by the write controlling module 31 shown in FIG. 3. Referring to FIG. 7, first of all, in step S1, the initial values of the parameters are read out from the reference table memory 52 and then are set to the parameters, and waiting is effected until a trigger signal is inputted in step S2. When the trigger signal is inputted (YES in step S2), a writing process is executed in step S3. It is decided in step S4 whether or not the writing process is completed, and the writing process of step S3 is executed until the completion of the writing process. When the writing process is completed (YES in step S4), the program flow proceeds to step S5, and then, it is decided whether or not there is the next writing process. When there is no next writing process (NO in step S5), then the write controlling process is completed. When there is the next writing process (YES in step S5), the next parameter values are read out from the reference table memory 52 and then set to the parameters at step S6, and thereafter, the program flow returns to step S2 to repeat the above-mentioned processes.

FIG. 8 is a flow chart showing a read controlling process which is executed by the read controlling module 32 shown in FIG. 4. Referring to FIG. 8, first of all, in step S11, the initial values of the parameter values are read out from the reference table memory 62 and then are set to the parameters, and waiting is effected until a trigger signal is inputted in step S12. When the trigger signal is inputted (YES in step S12), a measuring process for the reading is executed in step S13. It is decided in step S14 whether or not the measuring process is completed, and the measuring process of step S13 is executed until the completion of the process. When the measuring process is completed (YES in step S14), the program flow proceeds to step S15, and then, it is decided whether or not there is the next measuring process. When there is no next measuring process (NO in step S15), the read controlling process is completed. When there is the next measuring process (YES in step S15), the next parameter values are read out from the reference table memory 62 and then are set to the parameters at step S16, and thereafter, the program flow returns to step S12 to repeat the above-mentioned processes.

FIG. 9 is a flow chart showing a head position controlling process which is executed by the head position controlling module 33 shown in FIG. 5. Referring to FIG. 9, first of all, in step S21, the position of the magnetic head 4 is controlled so that the head position is set to a predetermined initial position, and waiting is effected until a trigger signal is inputted in step S22. When the trigger signal is inputted (YES in step S22), the head position is moved by a predetermined movement distance in step S23. Then it is decided in step S24 whether or not the next movement of the head is required. When no movement of the head is required (NO in step S24), the head position controlling process is completed. On the other hand, when another movement of the head is required (YES in step S24), the program flow returns to step S22 to repeat the above-mentioned processes. It is to be noted that a long time (which cannot be neglected as compared with the cycle of the Index signal) is required for the head position to reach the convergent position when the head is moved, and the head position does not normally converge within one Index signal.

FIG. 10 is a flow chart showing an MA position controlling process which is executed by the MA position controlling module 34 shown in FIG. 6. Referring to FIG. 10, first of all, in step S31, the position of the micro actuator 6 (the MA position) is controlled so that the position of the micro actuator 6 is set at a predetermined initial position, and waiting is effected until a trigger signal is inputted in step S32. When the trigger signal is inputted (YES in step S32), the MA position is moved by a predetermined movement distance in step S33. Then it is decided in step S34 whether or not the next movement of the micro actuator 6 is required. When no movement of the micro actuator 6 is required (no in step S34), the MA position controlling process is completed. On the other hand, when another movement of the micro actuator 6 is required (YES in step S34), the program flow returns to step S32 to repeat the above-mentioned processes. It is to be noted that a long time (which cannot be neglected as compared with the cycle of the Index signal) is required for the MA position to reach the convergent position when the MA is moved, and the MA position normally converges within one Index signal.

In the measuring apparatus 200 shown in FIG. 1, each of the modules 30 to 34 having the various functions is programmed with one process with respect to one trigger signal, executing a series of processes without the intervention of the CPU. For example, the write controlling module 31 executes writing data on each sector while changing the write current, and thereafter, the read controlling module 32 executes the measurement of data from each sector. The write controlling module 31 is preparatorily programmed with the write current to be set in the reference table memory 52 with respect to each trigger signal, and the setting is changed for respective sectors originally by the write controlling module 31. The write controlling module 31 and the read controlling module 32 are, respectively, programmed with relationships (delay time and measurement time) between a received trigger signal and the time interval for which operations (writing and measurement) are to be executed and so on in the reference table memories 52 and 62 in addition to the above. By operating only for the required time (associated as a pair with the physical position of the hard disk 1), the measurement of the disk region in which the data has been written is certainly achieved.

Therefore, according to the preferred embodiment, the measuring process can be executed at a higher speed than that of the first prior art.

In such a case where the spin stand 100 has a circuit for generating a plurality of trigger signals during one turn of the hard disk 1 and outputting the signals, the trigger signal may be used as a Sector signal without providing the frequency multiplier 42 shown in FIG. 2.

An operation example of executing the writing or measurement with one track divided into a plurality of sectors will be described next.

First Operation Example

First of all, as the first operation example, an example of an MR head bias current sweep will be described. Table 2 shows a processing procedure of the first operation example.

TABLE 2

Example of Sweep of MR head bias current
Example of measurement with parameter values of MR head bias current changed for respective sectors in measurement (reading out) Enable

| | |
|---|---|
| Index 1: | Erasing data on one track (in a special case where erasing means that the write pattern is "Erase" pattern) |
| Index 2: | Writing data on one track (for example, "HF (short-interval magnetization inverting data)" pattern) |
| Index 3: | Moving the head by the offset value |
| Index 4: | Waiting for convergence of movement of the head |
| Index 5: | Measuring the TAA with identical bias for respective sectors to measure reference values |
| Index 6: | Collecting all the TAA measurement data while changing MR head bias current for respective sectors, thereafter correcting the data, and displaying the result after correction |

As apparent from Table 2, all the operations are completed with six Index signals in the first operation example. For this execution, Table 3 shows a reference table stored in the reference table memory 41 of the trigger distribution module 30, while Table 4 shows reference tables stored in the reference table memories 52, 62 and 71 of the three controlling modules 31 to 33.

TABLE 3

Reference Table of Trigger Distribution Module 30 in Sweep Stage of MR Head Bias Current

| | Index Signal | | | | | |
|---|---|---|---|---|---|---|
| | 1 | 2 | 3 | 4 | 5 | 6 |
| OUT1 (Write Control) | Index | Index | NOP | NOP | NOP | NOP |
| OUT2 (Read Control) | NOP | NOP | NOP | NOP | Sector | Sector |
| OUT3 (Head Position) | NOP | NOP | Index | NOP | NOP | NOP |

TABLE 4

Reference Table of Controlling Modules 30, 32, and 33 in Sweep Stage of MR Head Bias Current

| | Trigger Signal No. | | | | | | |
|---|---|---|---|---|---|---|---|
| | 1 | 2 | ... | 10 | 11 | 12 | ... 20 |
| Reference Table of Controlling Module 33 | | | | | | | |
| Head Position (μm) | 0 | −0.1 | | | | | |
| Reference Table of Controlling Module 31 | | | | | | | |
| Write Current (mA) | 20 | 20 | | | | | |
| Delay Time (msec) | 0.1 | 0.1 | | | | | |
| Operating Time (msec) | 9.8 | 9.8 | | | | | |
| Data Pattern | Erase | HF | | | | | |

TABLE 4-continued

Reference Table of Controlling Modules 30, 32, and 33 in Sweep Stage of MR Head Bias Current

| | Trigger Signal No. | | | | | | |
|---|---|---|---|---|---|---|---|
| | 1 | 2 | ... | 10 | 11 | 12 | ... 20 |
| Reference Table of Controlling Module 32 | | | | | | | |
| Bias Current (mA) | 20 | 20 | ... | 20 | 10 | 12 | ... 0.1 |
| Delay Time (msec) | 0.1 | 0.1 | ... | 0.1 | 0.1 | 0.1 | ... 0.1 |
| Operating Time (msec) | 0.8 | 0.8 | ... | 0.8 | 0.8 | 0.8 | ... 0.8 |
| Measurement Item | TAA | TAA | ... | TAA | TAA | TAA | ... TAA |

As apparent from Table 3, the trigger signals OUT1, OUT2 and OUT3 to be outputted from the trigger distribution module 30 are listed with respect to the Index signal inputted to the trigger distribution module 30. Referring to Table 3, the Index signal is outputted directly as an Index trigger signal for the trigger signal OUT1 in response to an Index 1 signal which serves as a first Index, the Index signal is outputted directly as an Index trigger signal for the trigger signal OUT1 in response to an Index 2 signal which serves as a second Index, and no signal is outputted subsequently. In this case, "NOP" means that no process is executed, that is, no signal is outputted. In regard to the trigger signal OUT2, no signal is outputted until an Index 4 signal which serves as a fourth Index signal, and then, in response to an Index 5 which serves as a fifth Index signal, ten Sector signals outputted as the trigger signal OUT 2 from the frequency multiplier 42 are continuously and sequentially outputted. Then, in response to an Index 6 which serves as a sixth Index signal, ten Sector signals outputted as the trigger signal OUT3 from the frequency multiplier 42 are continuously and sequentially outputted, and thereafter, the operation is completed. Further, in regard to the trigger signal OUT3, no signal is outputted until the Index 2 signal which serves as the second Index signal, and then in response to an Index 3 which serves as a third Index signal, the Index signal is outputted directly as the trigger signal OUT3, and no signal is outputted subsequently.

Table 4 shows a list of the processing parameters which is executed in response to each trigger signal inputted to the controlling modules 31 to 33. In the present preferred embodiment, a plurality of tracks 1t are formed in a concentric circular form a round the center O of the hard disk 1. As shown in FIG. 14, one round for the track of the hard disk 1 (corresponding to the interval for the occurrence of the Index signal generated from the index sensor 5) is set to 10 milliseconds, and one track 1t is divided into 10 sectors 1s (1 millisecond per sector). In the present first operation example, as apparent from Table 2, after the writing process started by the Index 1 signal and the Index 2 signal of the trigger signal OUT1, the head position is moved by the Index 3 signal of the trigger signal OUT3, and thereafter, the reading process is executed. In this case, it is assumed that a time interval corresponding to two Index signals is required for the movement of the head position. That is, the trigger signal OUT2 is outputted after lapse of a time interval corresponding to two Index signals subsequently to the Index 3 signal which serves as the trigger signal OUT3 for moving the head.

Only the head position, the data pattern, the write current or the bias current in the reading stage, delay time (meaning the time of delay from the trigger signal) and the operating time (meaning an operation continuing time from the start of the operation) are described as the parameters to be set for simplicity of expansion according to the description of the operation example. However, in practical, there exists the other variable parameters such as the write compensation amount, and therefore, the present invention is not limited to the above description.

The present preferred embodiment adopts a system in which the controlling modules 31 to 33 do not discriminate whether the inputted trigger signal is the Index to the signal or the Sector trigger signal except for the arrangement that the operation time is set relatively short in the operation based on the Sector trigger signal and the operating time is set relatively long in the operation based on the Index trigger signal. The present invention may be constructed so that all of the controlling modules 31 to 33 receive the Index trigger signal and divide the Index trigger signal into the Sector signals within the controlling modules 31 to 33.

Further, the first operation example with described in detail below.

(a) Initial setting: The initial value (left-hand end; trigger signal No. 1) of the reference table of Table 4 is set, and after the setting, it is set to an "Enable" state. The term "Enable" means an operation to enable the Index from the spindle to be received.

(b) Index 1: According to the reference table of Table 3, the Index trigger signal is outputted as the trigger signal OUT1. In response to this, the write controlling module 31 writes an erase pattern for 9.8 milliseconds after a delay of 0.1 milliseconds from the Index trigger signal according to the reference table (trigger signal No. 1) of Table 4, and then, erases the data.

(c) Index 2: According to the reference table of Table 3, the Index trigger signal is outputted as the trigger signal OUT1. In response to this, the write controlling module 31 writes an HF (short-interval magnetization inverting data) pattern for 9.8 milliseconds after a delay of 0.1 milliseconds according to the reference table (trigger signal No. 2) of Table 4. After completing the writing process, the write controlling module 31 enters an end state.

(d) Index 3: According to the reference table of Table 3, the Index trigger signal is outputted as the trigger signal OUT3. In response to this, the head position controlling module 33 sets the head position in a position shifted by −0.1 μm from the predetermined form position according to the reference table (trigger signal No. 2) of Table 4.

(e) Index 4: According to the reference table of Table 3, the trigger signal is outputted to no output port of the trigger distribution module 30. None of the controlling modules 31 to 33 operates. The reason why such a time is provided is that a considerable time is required for the convergence of the head position and therefore, the next readable state cannot be achieved only with one Index signal.

(f) Index 5: According to the reference table of Table 3, the Sector trigger signal is outputted as the trigger signal OUT2. In regard to this Sector trigger signal, ten trigger signals are outputted from the trigger distribution module 30 for one Index signal. The operation of the read controlling module 32 for respective Sector trigger signals will be described below.

(f1) Sector 1: In response to the Sector trigger signal which serves as the trigger signal OUT2, the read controlling module 32 measures the TAA for 0.8 milliseconds after a delay of 0.1 milliseconds according to the reference table of Table 4.

(f2) Sector 2: In response to the Sector trigger signal which serves as the next trigger signal OUT2, the read controlling module 32 measures the TAA for 0.8 milliseconds after a delay of 0.1 milliseconds according to the reference table (trigger signal No. 11) of Table b 4.

(f3) Sector 3, 4, . . . , 9: The read controlling module 32 operates in a manner similar to that of the above (f1) and (f2).

(f4) Sector 10: In response to the Sector trigger signal which serves as the last trigger signal OUT2, the read controlling module 32 measures the TAA for 0.8 milliseconds after a delay of 0.1 milliseconds according to the reference table (trigger signal No. 20) of Table 4.

(g) Index 6: According to the reference table of Table 3, the Sector trigger signal which serves as the trigger signal OUT2 is outputted. In regard to this Sector trigger signal, ten Sector trigger signals are outputted from the trigger distribution module 30 for one Index signal. The operation of the read controlling module 32 for respective Sector trigger signals will be described below.

(g1) Sector 1: In response to the Sector trigger signal which serves as the first trigger signal OUT2, the read controlling module 32 measures the TAA for 0.8 milliseconds after a delay of 0.1 milliseconds with an MR head bias current of 10 mA according to the reference table of Table 4.

(g2) Sector 2: In response to the Sector trigger signal which serves as the second trigger signal OUT2, the read controlling module 32 measures the TAA for 0.8 milliseconds after a delay of 0.1 milliseconds with an MR head bias current of 12 mA according to the reference table of Table 4.

(g3) Sector 3, 4, . . . , 9: Operations similar to those of the above (g1) and (g2) are executed except for the operation of changing (increasing) only the MR head bias current in a step of 2 mA.

(g4) Sector 10: In response to the Sector signal which serves as the last trigger signal OUT2, the read controlling module 32 measures the TAA for 0.8 milliseconds after a delay of 0.1 milliseconds with an MR head bias current of 28 mA according to the reference table of Table 4. After completing the measurement, the controller 60 of the read controlling module 32 completes its operation.

Figure 13:
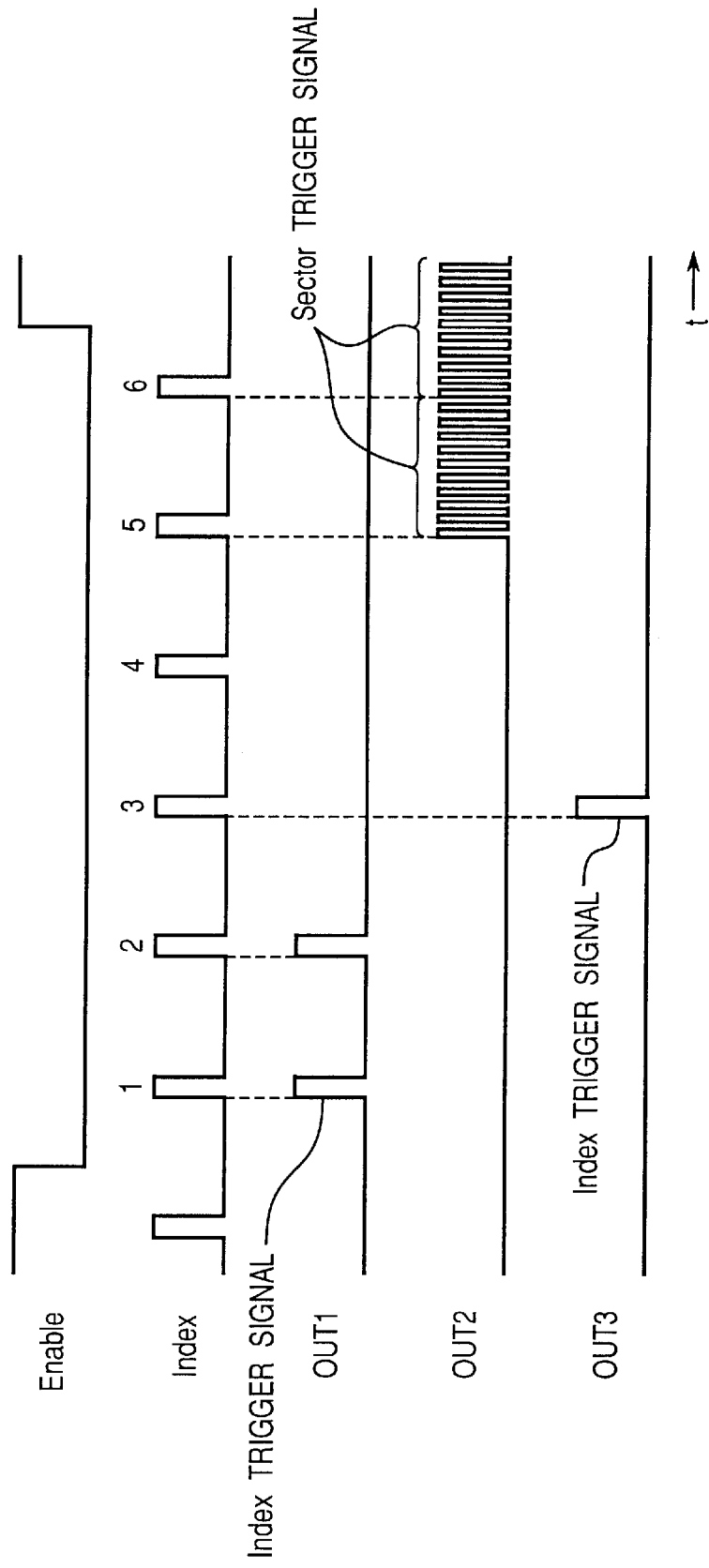
FIG. 13 is a timing chart showing an operation example of the trigger distribution module 30 in a sweep stage of an MR head bias current of the preferred embodiment.

FIG. 13 shows a timing chart in which the above-mentioned operations are arranged on the time axis, while Table 5 shows a timing chart of the operation for each Index signal. In contrast to the reference table of Table 4 which shows not any actual timing but the processing operation of the controlling module in response to the trigger signal, Table 5 shows the operation on the time axis for each Index signal.

TABLE 5

Operation Example of Each Control for Each Index Signal in Sweep Stage of MR Head Bias Current

| | Index Signal | | | | | |
|---|---|---|---|---|---|---|
| | 1 | 2 | 3 | 4 | 5 | 6 |
| Head Position Control | | | | | | |
| Head Position (μm) | 0 | | -0.1 | | | |
| Write Control | | | | | | |
| Trigger Signal | Index | Index | | | | |
| Write Current (mA) | 20 | 20 | | | | |
| Delay Time (msec) | 0.1 | 0.1 | | | | |
| Operating Time (msec) | 9.8 | 9.8 | | | | |
| Data Pattern | Erase | HF | | | | |
| Read Control | | | | | | |
| Trigger Signal | | | | | Sector   Sector   ...   Sector | Sector   Sector   ...   Sector |
| Bias Current (mA) | | | | | 20         20          ...    20 | 10         12          ...    0.1 |
| Delay Time (msec) | | | | | 0.1        0.1         ...    0.1 | 0.1        0.1         ...    0.1 |
| Operating Time (msec) | | | | | 0.8        0.8         ...    0.8 | 0.8        0.8         ...    0.8 |
| Measurement Item | | | | | TAA       TAA        ...   TAA | TAA       TAA        ...   TAA |

In the first operation example, as shown in FIG. 14, a margin interval of 0.1 milliseconds is formed at the beginning and at the end of one sector 1s. This margin interval is a time interval required for the setting and convergence of the set parameter value and also required as a margin for the variation in rotation of the spindle 2 and for the jitter of the Index signal.

Second Operation Example

Figure 15:
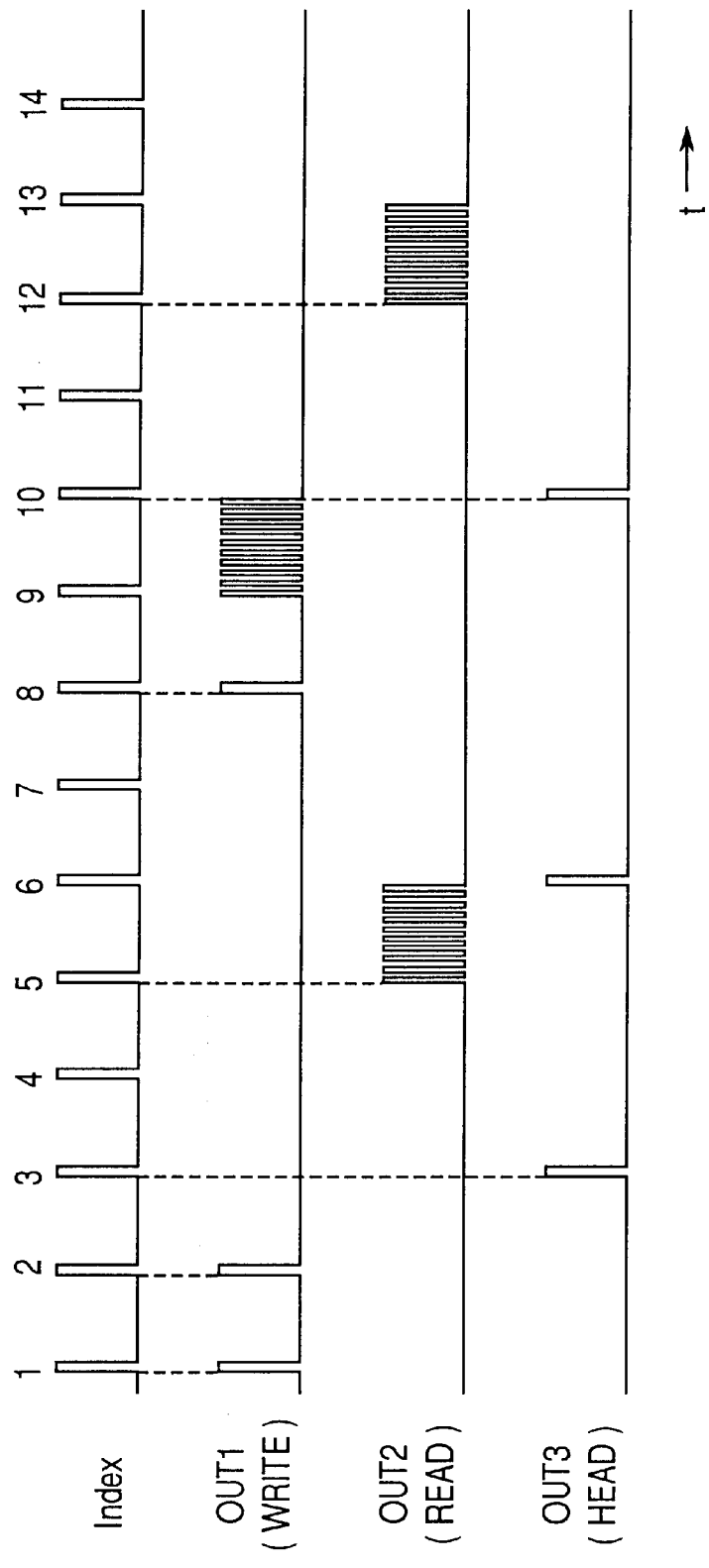
FIG. 15 is a timing chart showing an operation example of the trigger distribution module 30 in a sweep stage of a write current of the preferred embodiment.

As a further complicated example of a series of operations, an example in which a write operations executed with the write current changed for respective sectors and the TAA is measured. Table 6 is a description of the operation. Table 7 shows a reference table of the trigger distribution module 30 for implementing the operation, while Table 8 shows a reference table of three controlling modules 31 to 33 for implementing the operation. Further, FIG. 15 is a timing chart showing an operation corresponding to the operation of the first operation example shown in FIG. 13, while Tables 9 and 10 correspond to Table 5 of the first operation example and show the operation on the time axis for each Index signal. The manner of describing FIG. 15 and Tables of the second operation example is similar to those of the first operation example, and therefore, no description is provided for them.

TABLE 6

Example of Sweep of write current
Example of measurement with the parameter value
of write current changed for respective sectors in
writing and with fixed parameter value in reading (measuring)

Enable

| | |
|---|---|
| Index 1: | Erasing one track |
| Index 2: | Writing data only on one track |
| | (For example, "HF (short-interval magnetization inverting data)" pattern) |
| Index 3: | Moving head by offset |
| Index 4: | Waiting for convergence of the movement of the head |
| Index 5: | Measuring the TAA for respective sectors for taking reference value |
| Index 6: | Setting back head offset |
| Index 7: | Waiting for movement convergence |
| Index 8: | Erasing preceding track |
| Index 9: | Writing data on one track while changing write current for respective sectors |
| | (write pattern is, for example, "HF (short-interval magnetization inverting data)" pattern) |
| Index 10: | Moving by head offset |
| Index 11: | Waiting for convergence of the movement of the head |
| Index 12: | Collecting all the TAA measurement data for respective sectors, thereafter correcting the data and displaying the result after correction |

TABLE 7

Reference Table of Trigger Distribution Module 30 in Sweep Stage of Write Current

| | Index Signal | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| OUT 1 (Write Control) | Index | Index | NOP | NOP | NOP | NOP | NOP | Index | Sector | NOP | NOP | NOP |
| OUT 2 (Read Control) | NOP | NOP | NOP | NOP | Sector | NOP | NOP | NOP | NOP | NOP | NOP | Sector |
| OUT 3 (Head Position) | NOP | NOP | Index | NOP | NOP | Index | NOP | NOP | NOP | Index | NOP | NOP |

TABLE 8

Reference Tables of Controlling Modules 30, 32, and 33 in Sweep Stage of Write Current

| | Trigger Signal No. | | | | | | | | |
|---|---|---|---|---|---|---|---|---|---|
| | 1 | 2 | 3 | 4 | 5 | ... | 13 | 14 | ... 20 |
| Reference Table of Controlling Module 33 | | | | | | | | | |
| Head Position (μm) | 0 | −0.1 | 0 | −0.1 | | | | | |
| Reference Table of Controlling Module 31 | | | | | | | | | |
| Write Current (mA) | 20 | 20 | 20 | 10 | 12 | ... | 28 | | |
| Delay Time (msec) | 0.1 | 0.1 | 0.1 | 0.1 | 0.1 | ... | 0.1 | | |
| Operating Time (msec) | 9.8 | 9.8 | 9.8 | 0.8 | 0.8 | ... | 0.8 | | |
| Data Pattern | Erase | HF | Erase | HF | HF | ... | HF | | |
| Reference Table of Controlling Module 32 | | | | | | | | | |
| Bias Current (mA) | 20 | 20 | 20 | 20 | 20 | ... | 20 | 20 | ... 20 |
| Delay Time (msec) | 0.1 | 0.1 | 0.1 | 0.1 | 0.1 | ... | 0.1 | 0.1 | ... 0.1 |
| Operating Time (msec) | 0.8 | 0.8 | 0.8 | 0.8 | 0.8 | ... | 0.8 | 0.8 | ... 0.8 |
| Measurement Item | TAA | TAA | TAA | TAA | TAA | ... | TAA | TAA | ... TAA |

TABLE 9

Operation Example (Part 1) of Each Control for Each Index Signal in Sweep Stage of Write Current

| | Index Signal | | | | | | |
|---|---|---|---|---|---|---|---|
| | 1 | 2 | 3 | 4 | 5 | 6 | 7 |
| Head Position Control | | | | | | | |
| Head Position (μm) | 0 | | −0.1 | | | 0 | |
| Write Control | | | | | | | |
| Trigger Signal | Index | Index | | | | | |
| Write Current (mA) | 20 | 20 | | | | | |
| Delay Time (msec) | 0.1 | 0.1 | | | | | |
| Operating Time (msec) | 9.8 | 9.8 | | | | | |
| Data Pattern | Erase | HF | | | | | |
| Read Control | | | | | | | |
| Trigger Signal | | | | Sector | Sector | ... | Sector |
| Bias Current (mA) | | | | 20 | 20 | ... | 20 |
| Delay Time (msec) | | | | 0.1 | 0.1 | ... | 0.1 |
| Operating Time (msec) | | | | 0.8 | 0.8 | ... | 0.8 |
| Measurement Item | | | | TAA | TAA | ... | TAA |

TABLE 10

Operation Example (Part 2) of Each Control for Each Index Signal in Sweep Stage of Write Current

| | Index Signal | | | | |
|---|---|---|---|---|---|
| | 8 | 9 | 10 | 11 | 12 |
| Head Position Control | | | | | |
| Head Position (μm) | | | −0.1 | | |
| Write Control | | | | | |
| Trigger Signal | Index | Sector | Sector | ... | Sector |
| Write Current (mA) | 20 | 10 | 12 | ... | 28 |
| Delay Time (msec) | 0.1 | 0.1 | 0.1 | ... | 0.1 |
| Operating Time (msec) | 9.8 | 9.8 | 0.8 | ... | 0.8 |
| Data Pattern | Erase | HF | HF | ... | HF |
| Read Control | | | | | |
| Trigger Signal | | | Sector | Sector | ... Sector |
| Bias Current (mA) | | | 20 | 20 | ... 20 |
| Delay Time (msec) | | | 0.1 | 0.1 | ... 0.1 |
| Operating Time (msec) | | | 0.8 | 0.8 | ... 0.8 |
| Measurement Item | | | TAA | TAA | ... TAA |

As a reference table describing method, a description on the time axis for each Index signal as shown in Table 5 is acceptable. In other words, it is acceptable in the present invention to write such instructions that the controlling module executes nothing ("NOP") in response to a certain trigger signal into the reference table of the controlling module and make the trigger distribution module 30 continue to transmit a trigger signal.

In the construction of the above preferred embodiment, the trigger distribution module 30, the write controlling module 31, the read controlling module 32, the head position controlling module 33 and the MA position controlling module 34 are separated by their functions and each of them is provided by one printed circuit board like in the form of a module. However, the present invention is not limited to this, and it is acceptable to constitute them one by one module or constitute the modules 30 to 34 by separate units.

Next, the measuring method for measuring the characteristics of the movement distance to voltage of the micro actuator 6 provided in the spin stand 100 comprising the hard disk 1, which is a recording unit, by using the measuring apparatus 200 of FIG. 1 according to the preferred embodiment (referred to as a measuring method of MA hereinafter) will be described hereinafter. The control of the following measuring method is carried out by the main controller 20, by using the write controlling module 31, the read controlling module 32 and the MA position controlling module 34.

According to this measuring method, one track on the hard disk 1 which is a circular recording medium is divided into a plurality of sectors, and the performance characteristics of the recording unit for recording a data signal on the hard disk 1 are measured by using the magnetic head 4. The preferred embodiment is provided with the micro actuator 6 which moves the magnetic head 4 in the direction substantially perpendicular to the circumferential direction of the hard disk 1 in response to the MA position control signal. The preferred embodiment is characterized in that, while the MA position controlling module 34 moves the write element 4a of the magnetic head 4 by outputting the levels of the different control signals (corresponding to the control voltage Vc) corresponding to respective sectors to the micro actuator 6, the write controlling module 31 writes a write signal for each sector, and thereafter, the read controlling module 32 reads out the write signal which is written to each sector by using the read element 4b, and measures the write signal which is read out, as a read signal relative to the position of the read element 4b of the magnetic head 4. In addition, according to the preferred embodiment, while the read element 4b of the magnetic head 4 is moved by means of, for example, the piezo-electric stage 9a, by changing the level of the head position control signal from the head position controlling module 33 every time of one-round of the hard disk 1 performed by means of the spindle motor driving circuit 11, the read controlling module 32 reads out the above written write signal for each sector so that the read-out write signal is measured as a read signal relative to the position of the read element 4b, thereby measuring the characteristic of the read signal relative to the position of the read element 4b of the magnetic head 4 for each sector (graph of TAA in FIG. 29B). Further, based on the above measured characteristic of the read signal relative to the position of the read element 4b for each sector, the position of the read element 4b corresponding to the maximum value of the read signal for each sector is calculated, and then, the characteristic of the position of the read element 4b relative to the level of the above control signal (the characteristic of the movement distance to voltage shown in FIG. 29C) is measured based on the calculated position of the read element 4b for each sector.

This measuring method will be described in detail hereinafter with reference to FIGS. 28 and 29A to 29C.

Figure 20:
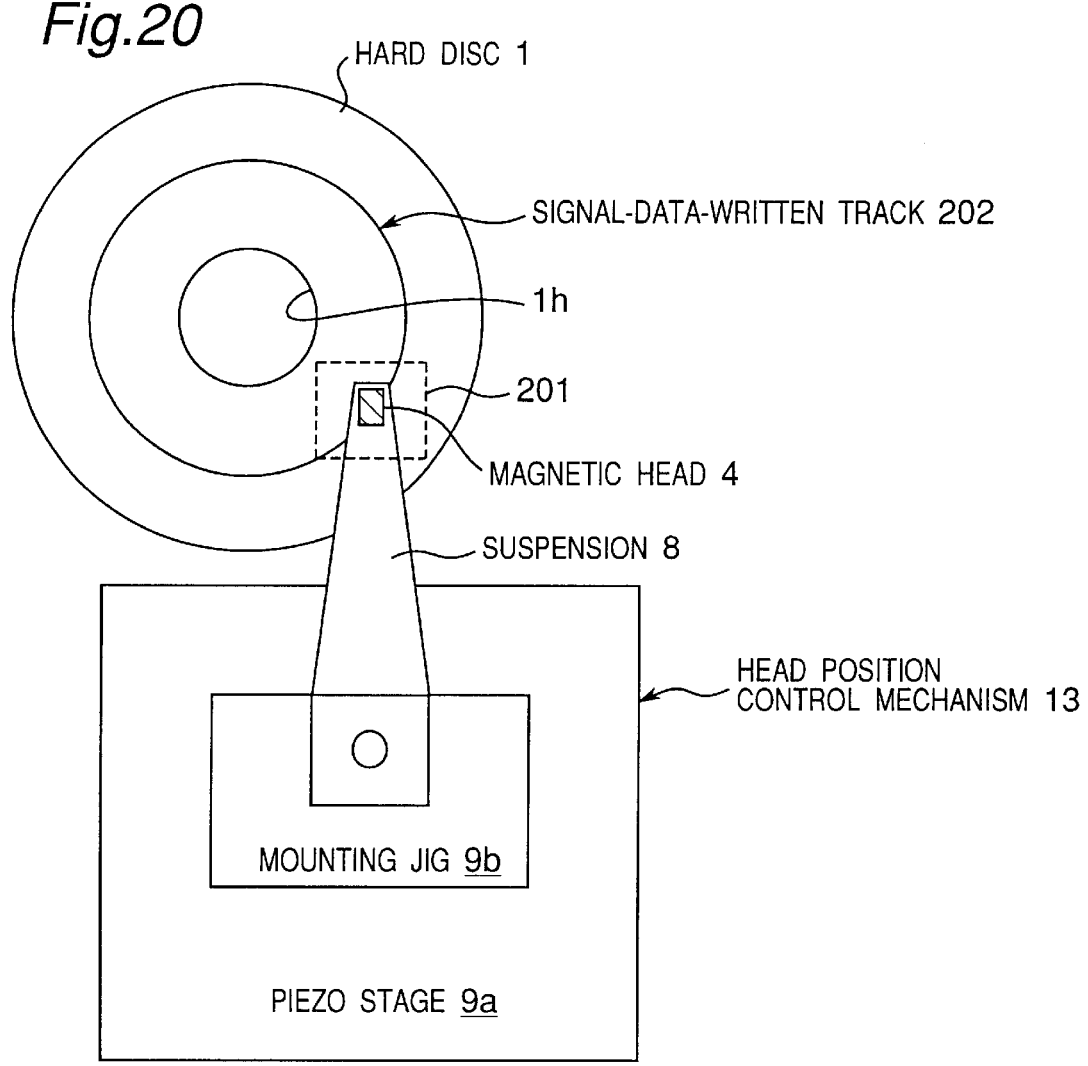
FIG. 20 is a plan view showing an operation of the magnetic head 4 shown in FIG. 1 when the magnetic head 4 writes a track 202 of a write signal on a hard disk 1.
Figure 21:
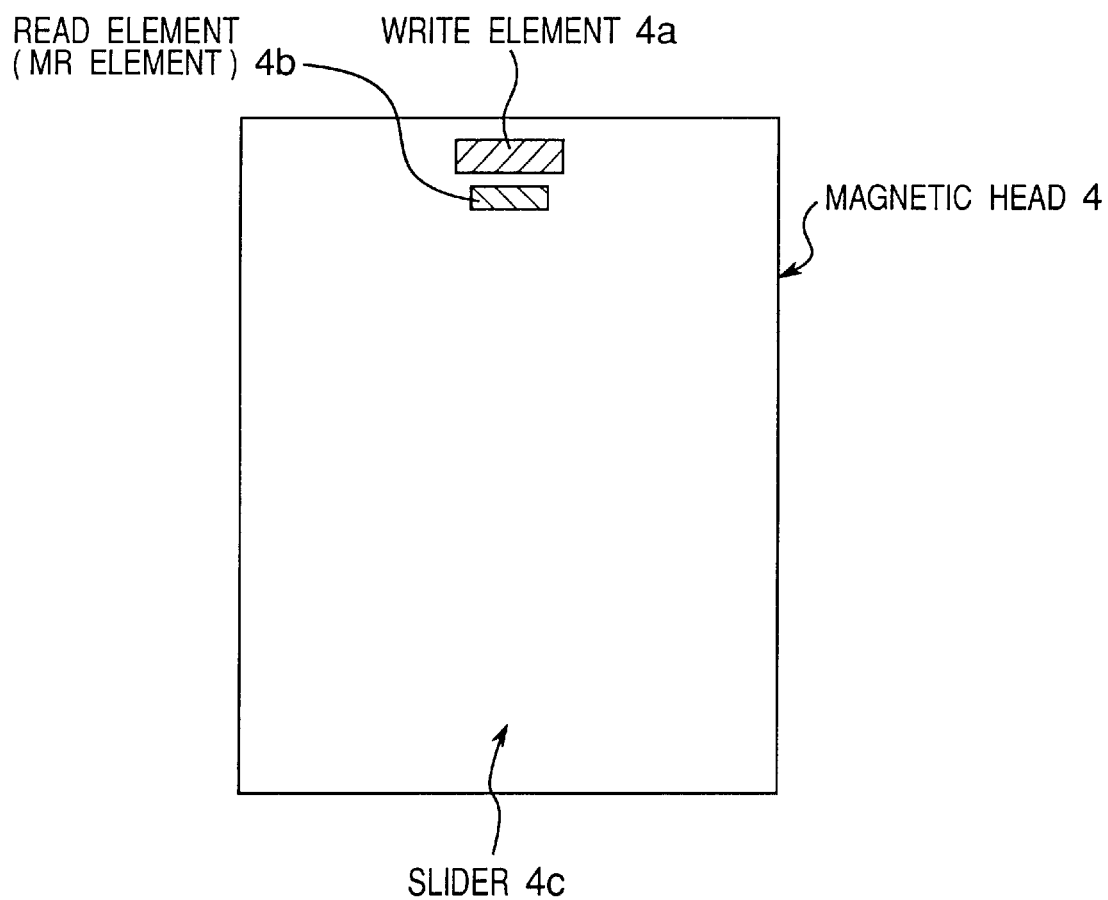
FIG. 21 is a plan view showing a detailed construction of the magnetic head 4 shown in FIG. 1.
Figure 22:
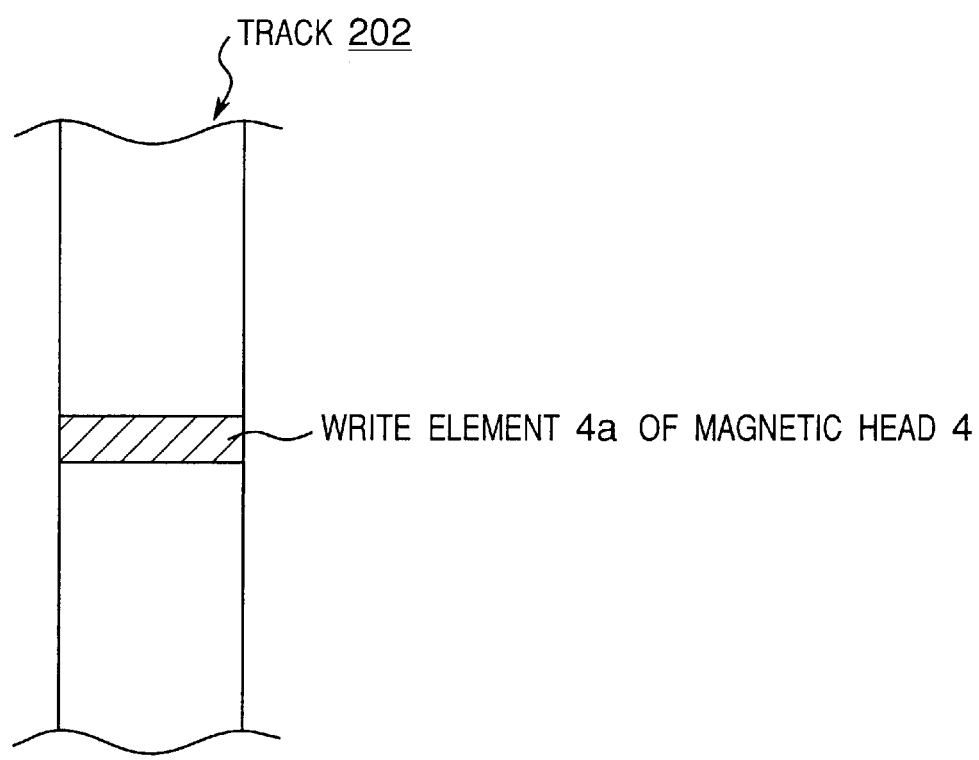
FIG. 22 is an enlarged view showing details of a part 201 shown in FIG. 20.
Figure 24:
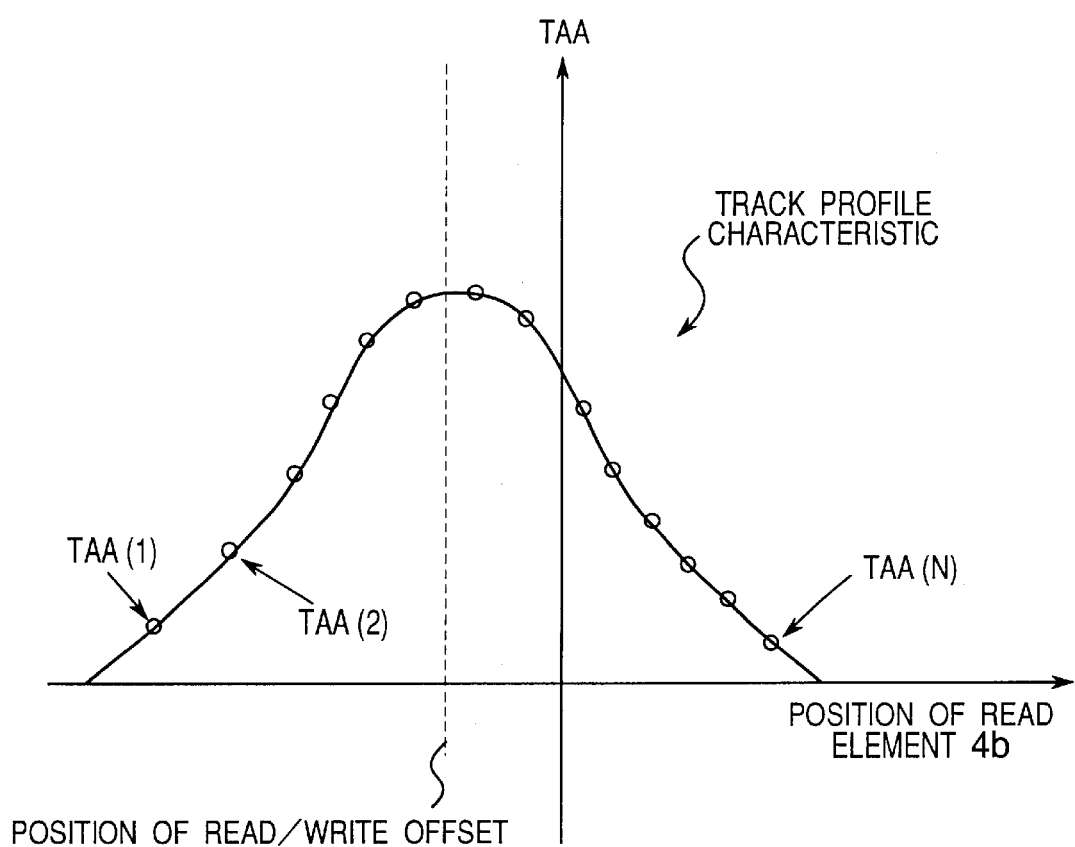
FIG. 24 is a graph showing a track profile characteristic measured by the measuring method according to the prior art.
Figures 25A, 25B, 25C, 25D:
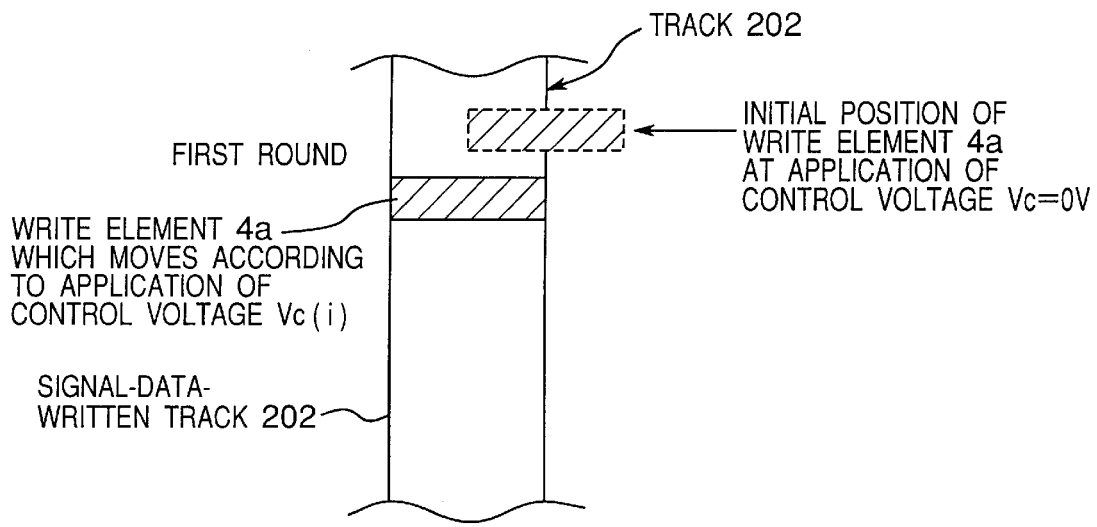
FIGS. 25A, 25B, 25C and 25D are views showing a control method of a micro actuator 6 of the measuring method according to the prior art.
Figure 26:
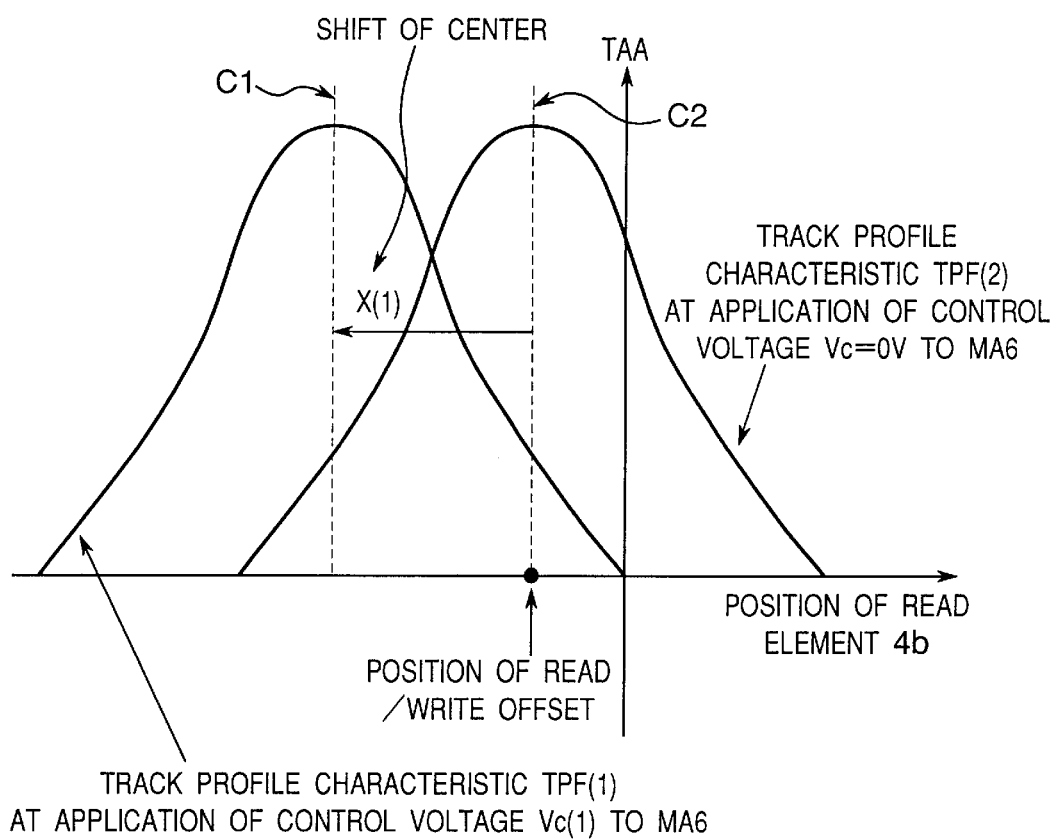
FIG. 26 is a graph showing a shift of a center of the track profile characteristic measured by the measuring method according to the prior art.
Figure 27:
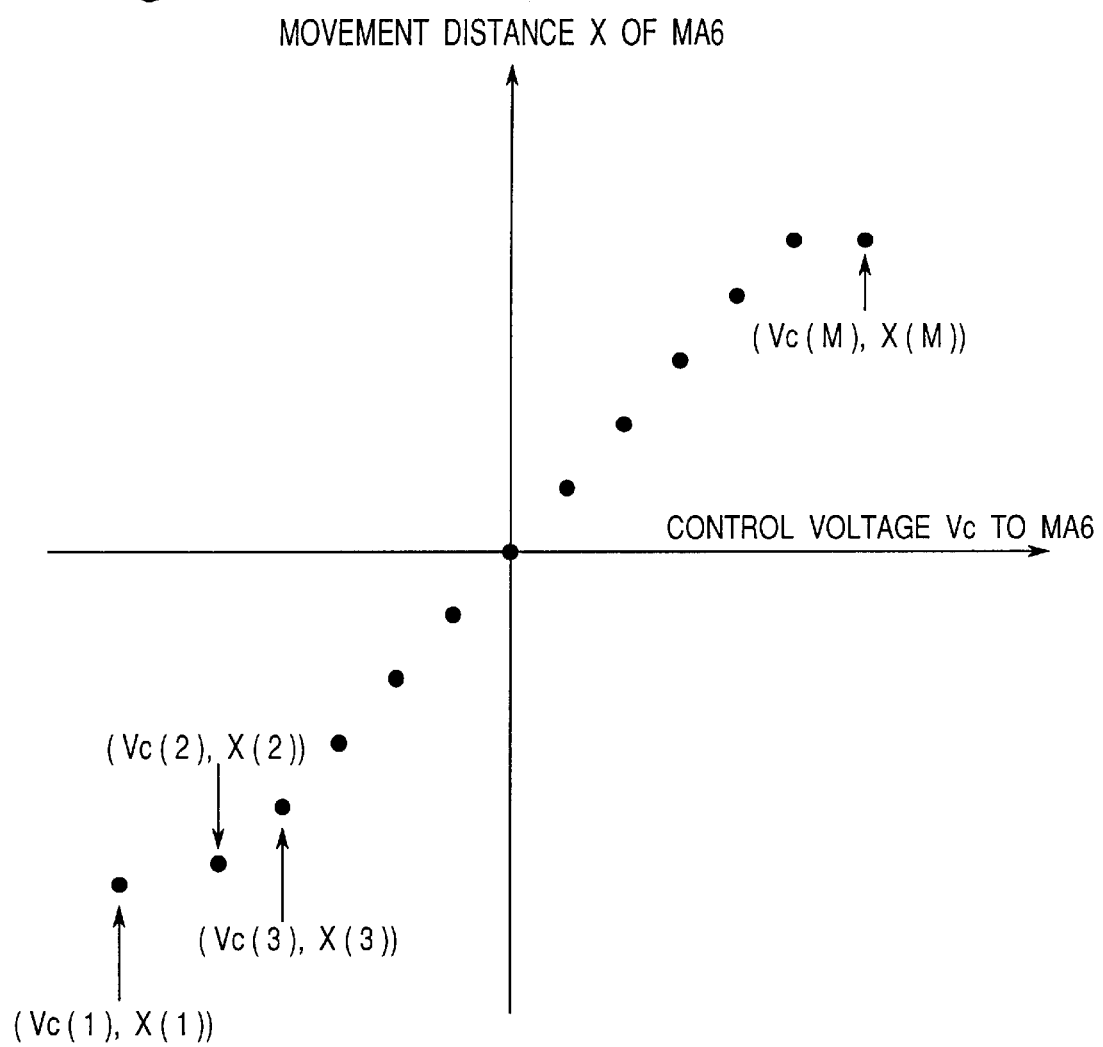
FIG. 27 is a graph showing an example of a movement distance X characteristic of the micro actuator 6 relative to the control voltage Vc of the micro actuator 6 measured by the measuring method according to the prior art.

First of all, as shown in FIG. 28, in order to divide one round of the hard disk 1 into a plurality of M pieces or segments, while rotating the hard disk 1 by controlling the spindle motor driving circuit 11, the write signal from the write controlling module 31 is written in the hard disk 1 under such a state that the position of the micro actuator 6 is moved by applying the control voltages Vc (1), Vc (2), ..., Vc (M) corresponding to the MA position control signals from the MA position controlling module 34, thereby forming a plurality of M segments 203-1 to 203-M (each segment is defined as a sector in which data of a write signal has been written). Next, the characteristic of the movement distance to voltage of the micro actuator 6 is measured for a time interval when the hard disk 1 is rotated by one round by controlling the spindle motor driving circuit 11 in the case where data of write signals of each segment 203-1 to 203-M are read out by using the read controlling module 32. In this measuring method, reading-out is carried out by measuring the TAA while moving the piezo-electric stage 9a in a manner similar to that of the method described with reference to FIG. 20 (See FIG. 29A).

Next, all the data of the measured TAA is not averaged but rather, they are time-divided into M pieces, and there are measured the track profile characteristics of the TAA exhibiting a TAA value relative to the position of the read element 4b of magnetic head 4 (position as defined in the direction substantially perpendicular to the circumferential direction of the hard disk 1) with respect to each of the segments 203-1 to 203-M of the M sectors (See FIG. 29B). Then, the main controller 20 calculates the movement distances X (1), X (2), . . . , X (M) from the track profile characteristics of each TAA, and plots the movement distances X (1), X (2), . . . , X (M) calculated respectively for the respective control voltages Vc (1) to Vc (M) corresponding to respective segments 203-1 to 203-M, as characteristic of the movement distance X of the micro actuator 6 relative to the control voltage Vc of the micro actuator 6, thereby measuring the characteristic of the movement distance to voltage of the micro actuator 6. According to the above measurements, receiving all the data can be completed by 2×N rounds, and in the case of the above example, the same graph can be obtained in 0.4 seconds. The measured data of the movement distance and the voltage characteristic of the micro actuator 6 is outputted and displayed on the CRT display 22, and at the same time, is outputted and printed by the printer 23.

In this case, when there is a possibility that the movement of the micro actuator 6 can not instantly be carried out upon writing write signals into the segments 203-1 to 203-M, there may be used a method of writing write signals therein after the movement of the micro actuator 6 is sufficiently converged by using one round for writing write signals for one track (referred to as a measuring method of the MA according a modified preferred embodiment hereinafter). At that time, the measuring time becomes 0.5 seconds since an extra ten rounds are required for the writing.

Next, an operation example for writing write signals into the segments 203-1 to 203-M will be described hereinafter.

Third Operation Example

The next table corresponds to a measuring method of the MA according to the modified preferred embodiment, and shows an operation example for writing write signals into a plurality of segments by changing the control voltage Vc of the MA 6 for respective sectors. This case is for setting write timings by setting output timings of the Sector trigger signal with predetermined serial numbers of the Index signal.

TABLE 11

Third Operation Example for Forming Segments by Writing Write Signal While Changing Control Voltage to MA6 for Each Sector

| | Index Signal | | | | | | | | | | | |
|---|---|---|---|---|---|---|---|---|---|---|---|---|
| | 1 | 2 | 3 | 4 | 5 | 6 | 7 | 8 | 9 | 10 | 11 | ... |
| Head Position Control | | | | | | | | | | | | |
| Head Position (μm) Write Control (OUT1) | 0 | | | | | | | | | | | ... |
| Trigger Signal Delay Time (msec) | | | Sector 0.1 | | ... | Sector 0.1 | | ... | Sector 0.1 | | ... | ... |
| Operating Time (msec) MA Position Control (OUT4) | | | 0.9 | | | 0.9 | | | 0.9 | | | |
| Trigger Signal MA Position | Index P1 | | | Index P2 | | | Index P3 | | | Index P4 | | ... |

As described above, the position of the micro actuator 6 is not stable for a while after the control voltage Vc is applied, and therefore, after one segment is written therein, the micro actuator 6 is moved and the main controller 20 goes into a waiting state until becoming stable, and then, the next segment is written therein. In the third operation example, in response to the first Index signal, the main controller 20 outputs an instruction signal for moving the position of the micro actuator 6 into a predetermined position P1, the main controller 20 goes into the waiting state until the position of the micro actuator 6 has converged during outputting of the second Index signal, and thereafter, the segment of the next sector is written therein in response to the third Index signal. The other further segments are written therein in the same manner. Namely, while shifting the position for writing a segment in the circumferential direction of the segment as shown in FIG. 28, and while shifting each timing in the sector direction, a write signal is written into the hard disk 1 so as to form the segments 203-1 to 203-M. In this case, respective write timings are characterized by being set through setting with predetermined serial numbers of the Index signals.

Fourth Operation Example

The next table corresponds to a measuring method of the MA according to the modified preferred embodiment, and shows an operation example for writing write signals in a plurality of segments by changing the control voltage Vc of the MA 6 for respective sectors. This case is for setting the write timings by setting output timings of the Sector trigger signal so as to change the delay time from the timing when the Index signal is received.

TABLE 12

Fourth Operation Example for Forming Segments by Writing Write Signals While Changing Control Voltage to MA6 for Each Sector

|  | Index Signal | | | | | | | | | | |
|---|---|---|---|---|---|---|---|---|---|---|---|
|  | 1 | 2 | 3 | 4 | 5 | 6 | 7 | 8 | 9 | 10 | 11 ... |
| Head Position Control |  |  |  |  |  |  |  |  |  |  |  |
| Head Position ($\mu$m) | 0 |  |  |  |  |  |  |  |  |  | ... |
| Write Control (OUT1) |  |  |  |  |  |  |  |  |  |  |  |
| Trigger Signal Delay Time (msec) |  |  | Index 0.1 |  |  | Index 1.1 |  |  | Index 2.1 |  | ... |
| Operating Time (msec) |  |  | 0.9 |  |  | 1.9 |  |  | 2.9 |  |  |
| MA Position Control (OUT4) |  |  |  |  |  |  |  |  |  |  |  |
| Trigger Signal MA Position | Index P1 |  |  | Index P2 |  |  | Index P3 |  |  | Index P4 | ... |

In the fourth operation example, in response to the first Index signal, the main controller 20 outputs an instruction signal for moving the position of the micro actuator 6 into a predetermined position P1, the main controller 20 goes into a waiting state until the position of the micro actuator 6 has converged during outputting of the second Index signal, and thereafter, a segment of the next sector is written therein in response to the third Index signal. The other further segments are written therein in the same manner. Namely, while shifting the position for writing a segment in the circumferential direction of the segment as shown in FIG. 28 and while shifting each timing in the sector direction, a write signal is written into the hard disk 1 so as to form the segments 203-1 to 203-M. In this case, respective write timings are characterized in that the output timings of the Sector trigger signal are set so as to change delay time from the timing when the Index signal is received.

Modified Preferred Embodiments

In the above-mentioned preferred embodiments, the characteristic of the movement distance X relative to the control voltage Vc of the micro actuator 6 shown in FIG. 29C is measured, however, the present invention is not limited to this. The results of measuring the characteristics of the TAA relative to the read element 4b for each sector shown in FIG. 29B may be outputted to the CRT display 22 and/or the printer 23 as measuring results of the present measuring apparatus 200. Referring to FIG. 29C, for example, by sweeping the control voltage Vc between the value corresponding to the left end point of FIG. 29C and the value corresponding to the right end point in a reciprocating manner, the hysteresis characteristic of the characteristic of the movement distance to voltage of the micro actuator 6 can be observed and measured. In this case, when the magnetic head 4 is mounted, it is common for the micro actuator 6 to be in a non-polarized state, and therefore, in many cases, it is preferable to start the control voltage Vc from the point located in the center of FIG. 29C.

The above-mentioned preferred embodiments each describe the measuring apparatus for the recording unit including the recording medium of the hard disk. However, the present invention is not limited to this, and can be applied to a measuring apparatus for use in a recording unit for measuring performance characteristics of a recording unit including a circular recording medium such as a floppy disk, an optical disk such as a CD, a DVD, a magneto-optical disk (of a ROM, write once type, rewriting type) or the like, and components such as a head for recording a data signal on the above recording medium.

In the above-mentioned preferred embodiments, the trigger distribution module 30 of FIG. 2 is made of a hardware circuit, the present invention is not limited to this. However, it may be made of a CPU or a DSP which executes a computer program of software.

In the above-mentioned preferred embodiments and modified preferred embodiment, the data of the measuring results is displayed on the CRT display 22 or are outputted and printed by the printer 23, the present invention is not limited to this. However, the data thereof may be stored in a predetermined storage unit.

In the above-mentioned preferred embodiments, the characteristics of the movement distance to voltage of the micro actuator 6 are measured, however, parameters such as a hysteresis characteristic, a maximum displacement, a linearity and the like may be measured from these characteristics through calculation.

Advantageous Effects of Preferred Embodiments

As described above, according to a measuring apparatus or a measuring method of the above-mentioned preferred embodiments of the present invention, in a measuring apparatus or a measuring method for measuring performance characteristics of a recording unit including a circular recording medium on which one track is divided into a plurality of sectors, the recording unit recording a data signal on the recording medium by using a magnetic head. Mechanism means moves the magnetic head in a direction substantially perpendicular to a circumferential direction of the recording medium in response to a control signal, writing means writes a write signal for respective sectors while moving the magnetic head by outputting the control signal having different levels corresponding to respective sectors to the mechanism means, and reading means reads out the write signal written by the writing means, and for measuring a read-out write signal as a read signal relative to a position of the magnetic head.

Also, the reading means preferably measures characteristics of the read signal relative to the position of the magnetic head for respective sectors, by reading out the write signal written by the writing means for respective sectors while moving the magnetic head by changing the level of the control signal each time of one-round rotation of the recording medium, and by measuring the read-out write signal as a read signal relative to the position of the magnetic head.

Further, a further calculating means preferably calculates the position of the magnetic head corresponding to a maximum value of the read signal for respective sectors based on the measured characteristics of the read signal relative to the position of the magnetic head for respective sectors, and for measuring characteristics of the position of the magnetic head relative to the level of the control signal based on a calculated position of the magnetic head for respective sectors.

Accordingly, the preferred embodiments of the present invention can provide a measuring apparatus and a measuring method for use in a recording unit which can shorten the measuring time as compared with that of the prior art upon measuring the characteristics of the movement distance to voltage of the recording unit. In addition, the measuring apparatus for use in the recording unit can be constructed with a simple structure as compared with that of the prior art, and the performance characteristics of the recording medium can be measured at a higher speed.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A measuring apparatus for measuring performance characteristics of a recording unit including a circular recording medium on which one track is divided into a plurality of sectors, said recording unit recording a data signal on said recording medium by using a magnetic head, said measuring apparatus comprising:

mechanism means for moving said magnetic head in a direction substantially perpendicular to a circumferential direction of said recording medium in response to a control signal;

writing means for writing a write signal for respective sectors while moving said magnetic head by outputting the control signal having different levels corresponding to respective sectors to said mechanism means; and reading means for reading out the write signal written by said writing means, and for measuring a read-out write signal as a read signal relative to a position of said magnetic head.

2. The apparatus as claimed in claim 1, wherein said reading means measures characteristics of the read signal relative to the position of said magnetic head for respective sectors, by reading out the write signal written by said writing means for respective sectors while moving said magnetic head by changing the level of said control signal each time of one-round rotation of said recording medium, and by measuring the read-out write signal as a read signal relative to the position of said magnetic head.

3. The apparatus as claimed in claim 2, further comprising:

calculating means for calculating the position of the magnetic head corresponding to a maximum value of the read signal for respective sectors based on the measured characteristics of the read signal relative to the position of said magnetic head for respective sectors, and for measuring characteristics of the position of the magnetic head relative to the level of said control signal based on a calculated position of the magnetic head for respective sectors.

4. The apparatus as claimed in claim 1, wherein said writing means generates a plurality of Sector trigger signals corresponding to the plurality of sectors by multiplying a frequency of an Index signal generated each time of one-round rotation of said recording medium, and for writing write signals for respective sectors based on the plurality of Sector trigger signals.

5. The apparatus as claimed in claim 2, wherein said writing means generates a plurality of Sector trigger signals corresponding to the plurality of sectors by multiplying a frequency of an Index signal generated each time of one-round rotation of said recording medium, and for writing write signals for respective sectors based on the plurality of Sector trigger signals.

6. The apparatus as claimed in claim 3, wherein said writing means generates a plurality of Sector trigger signals corresponding to the plurality of sectors by multiplying a frequency of an Index signal generated each time of one-round rotation of said recording medium, and for writing write signals for respective sectors based on the plurality of Sector trigger signals.

7. The apparatus as claimed in claim 1, wherein said writing means generates respective timing signals delayed respectively by a plurality of predetermined delay times from an Index signal generated each time of one-round rotation of said recording medium, and for writing write signals for respective sectors based on the respective timing signals.

8. The apparatus as claimed in claim 2, wherein said writing means generates respective timing signals delayed respectively by a plurality of predetermined delay times from an Index signal generated each time of one-round rotation of said recording medium, and for writing write signals for respective sectors based on the respective timing signals.

9. The apparatus as claimed in claim 3, wherein said writing means generates respective timing signals delayed respectively by a plurality of predetermined delay times from an Index signal generated each time of one-round rotation of said recording medium, and for writing write signals for respective sectors based on the respective timing signals.

10. The apparatus as claimed in claim 1, wherein said mechanism means comprises a micro actuator and a piezo-electric stage.

11. A measuring method for measuring performance characteristics of a recording unit including a circular recording medium on which one track is divided into a plurality of sectors, said recording unit recording a data signal on said recording medium by using a magnetic head, said measuring method including the steps of:

moving said magnetic head in a direction substantially perpendicular to a circumferential direction of said recording medium in response to a control signal by using mechanism means;

writing a write signal for respective sectors while moving said magnetic head by outputting the control signal having different levels corresponding to respective sectors; and reading out the written write signal, and for measuring a read-out write signal as a read signal relative to a position of said magnetic head.

12. The method as claimed in claim 11, wherein said reading step includes a step of measuring characteristics of the read signal relative to the position of said magnetic head for respective sectors, by reading out the written write signal for respective sectors while moving said magnetic head by changing the level of said control signal each time of one-round rotation of said recording medium, and by measuring the read-out write signal as a read signal relative to the position of said magnetic head.

13. The method as claimed in claim 12, further including a step of:

calculating the position of the magnetic head corresponding to a maximum value of the read signal for respective sectors based on the measured characteristics of the read signal relative to the position of said magnetic head for respective sectors, and for measuring characteristics of the position of the magnetic head relative to the level of said control signal based on a calculated position of the magnetic head for respective sectors.

14. The method as claimed in claim 11, wherein said writing step includes a step of generating a plurality of Sector trigger signals corresponding to the plurality of sectors by multiplying a frequency of an Index signal generated each time of one-round rotation of said recording medium, and writing write signals for respective sectors based on the plurality of Sector trigger signals.

15. The method as claimed in claim 12, wherein said writing step includes a step of generating a plurality of Sector trigger signals corresponding to the plurality of sectors by multiplying a frequency of an Index signal generated each time of one-round rotation of said recording medium, and writing write signals for respective sectors based on the plurality of Sector trigger signals.

16. The method as claimed in claim 13, wherein said writing step includes a step of generating a plurality of Sector trigger signals corresponding to the plurality of sectors by multiplying a frequency of an Index signal generated each time of one-round rotation of said recording medium, and writing write signals for respective sectors based on the plurality of Sector trigger signals.

17. The method as claimed in claim 11, wherein said writing step includes a step of generating respective timing signals delayed respectively by a plurality of predetermined delay times from an Index signal generated each time of one-round rotation of said recording medium, and writing write signals for respective sectors based on the respective timing signals.

18. The method as claimed in claim 12, wherein said writing step includes a step of generating respective timing signals delayed respectively by a plurality of predetermined delay times from an Index signal generated each time of one-round rotation of said recording medium, and writing write signals for respective sectors based on the respective timing signals.

19. The method as claimed in claim 13, wherein said writing step includes a step of generating respective timing signals delayed respectively by a plurality of predetermined delay times from an Index signal generated each time of one-round rotation of said recording medium, and writing write signals for respective sectors based on the respective timing signals.

20. The method as claimed in claim 11, wherein said mechanism means comprises a micro actuator and a piezo-electric stage.

* * * * *